(12) United States Patent
Rogers et al.

(10) Patent No.: US 9,111,456 B2
(45) Date of Patent: Aug. 18, 2015

(54) DYNAMICALLY PRESENTING PRACTICE SCREENS TO DETERMINE STUDENT PREPAREDNESS FOR ONLINE TESTING

(75) Inventors: Timothy A. Rogers, Carol Stream, IL (US); John Bosko, Elgin, IL (US); Corey S. O'Brien, Hanover Park, IL (US); Raghubir S. Mutum, Bolingbrook, IL (US)

(73) Assignee: HOUGHTON MIFFLIN HARCOURT PUBLISHING COMPANY, Boston, MA (US)

(*) Notice: Subject to any disclaimer, the term of this patent is extended or adjusted under 35 U.S.C. 154(b) by 1604 days.

(21) Appl. No.: 11/853,584

(22) Filed: Sep. 11, 2007

(65) Prior Publication Data
US 2008/0102433 A1 May 1, 2008

Related U.S. Application Data

(60) Provisional application No. 60/825,246, filed on Sep. 11, 2006, provisional application No. 60/941,984, filed on Jun. 5, 2007.

(51) Int. Cl.
*G09B 7/02* (2006.01)
(52) U.S. Cl.
CPC ....................................... *G09B 7/02* (2013.01)
(58) Field of Classification Search
USPC .................................................. 434/322, 350
See application file for complete search history.

(56) References Cited

U.S. PATENT DOCUMENTS

| | | | |
|---|---|---|---|
| 5,002,491 A | 3/1991 | Abrahamson et al. | |
| 5,195,033 A | 3/1993 | Samph et al. | |
| 5,267,865 A | 12/1993 | Lee et al. | |
| 5,270,833 A | 12/1993 | Kubokawa et al. | |
| 5,302,132 A | 4/1994 | Corder | |
| 5,310,349 A * | 5/1994 | Daniels et al. | 434/350 |
| 5,565,316 A | 10/1996 | Kershaw et al. | |
| 5,596,714 A | 1/1997 | Connell | |
| 5,615,134 A | 3/1997 | Newsham et al. | |
| 5,823,788 A | 10/1998 | Lemelson et al. | |
| 5,827,070 A | 10/1998 | Kershaw et al. | |
| 5,983,001 A | 11/1999 | Boughner et al. | |
| 6,112,312 A | 8/2000 | Parker et al. | |
| 6,141,528 A | 10/2000 | Remschel | |
| 6,149,441 A * | 11/2000 | Pellegrino et al. | 434/350 |
| 6,155,840 A | 12/2000 | Sallette et al. | |
| 6,164,974 A | 12/2000 | Carlile et al. | |

(Continued)

OTHER PUBLICATIONS

"U.S. Appl. No. 11/877,428, Non-Final Office Action mailed Jul. 23, 2008.", OARN,7 pgs.

(Continued)

*Primary Examiner* — Kesha Frisby
(74) *Attorney, Agent, or Firm* — GTC Law Group LLP & Affiliates

(57) ABSTRACT

An online test platform facilitates the dynamic presentation of practice screens to determine student preparedness for online testing. The platform also facilitates development, delivery, and management of educational tests with interactive participation by students, teachers, proctors, and administrators even when some or all of them are remotely located. The platform may include administrator interfaces, test proctor interfaces, and test taker (e.g. student) interfaces to allow each participant to view, navigate, and interact with aspects of the online test platform that are intended to meet their needs.

20 Claims, 22 Drawing Sheets

(56) References Cited

U.S. PATENT DOCUMENTS

| | | |
|---|---|---|
| 6,208,832 B1 | 3/2001 | Remschel et al. |
| 6,302,698 B1 | 10/2001 | Ziv-El |
| 6,476,806 B1 | 11/2002 | Cunniff et al. |
| 6,633,912 B1 | 10/2003 | Welter et al. |
| 6,688,889 B2 | 2/2004 | Wallace et al. |
| 6,704,741 B1 | 3/2004 | Lively, Jr. et al. |
| 6,816,702 B2 | 11/2004 | Kuntz et al. |
| 6,988,138 B1 | 1/2006 | Alcorn et al. |
| 6,988,239 B2 | 1/2006 | Womble et al. |
| 7,085,999 B2 | 8/2006 | Maeda et al. |
| 7,133,906 B2 | 11/2006 | Price et al. |
| 7,286,793 B1 | 10/2007 | Miele |
| 7,343,134 B1 | 3/2008 | Ward |
| 7,632,101 B2 * | 12/2009 | Braunberger et al. ........ 434/322 |
| 7,713,065 B2 | 5/2010 | Rogers et al. |
| 7,743,090 B1 | 6/2010 | Gibson et al. |
| 7,870,416 B2 | 1/2011 | D'souza et al. |
| 7,886,029 B2 | 2/2011 | Rogers et al. |
| 7,936,727 B2 | 5/2011 | Nakae et al. |
| 8,128,415 B2 | 3/2012 | Rogers et al. |
| 8,219,021 B2 | 7/2012 | Rogers et al. |
| 8,234,089 B2 | 7/2012 | Grey et al. |
| 8,297,984 B2 | 10/2012 | Rogers |
| 2001/0031457 A1 | 10/2001 | Pfenninger et al. |
| 2002/0032762 A1 | 3/2002 | Price et al. |
| 2002/0034720 A1 | 3/2002 | McManus et al. |
| 2002/0095436 A1 | 7/2002 | Lee |
| 2002/0160347 A1 | 10/2002 | Wallace et al. |
| 2002/0168621 A1 | 11/2002 | Cook et al. |
| 2002/0169822 A1 | 11/2002 | Packard et al. |
| 2002/0172931 A1 | 11/2002 | Greene et al. |
| 2002/0177109 A1 | 11/2002 | Robinson et al. |
| 2002/0184309 A1 | 12/2002 | Danker et al. |
| 2003/0044760 A1 | 3/2003 | Banerjee |
| 2003/0152904 A1 | 8/2003 | Doty |
| 2003/0175676 A1 | 9/2003 | Theilmann et al. |
| 2003/0175677 A1 | 9/2003 | Kuntz et al. |
| 2003/0180703 A1 | 9/2003 | Yates et al. |
| 2003/0232318 A1 | 12/2003 | Altenhofen et al. |
| 2004/0018479 A1 | 1/2004 | Pritchard et al. |
| 2004/0110119 A1 | 6/2004 | Riconda et al. |
| 2004/0115600 A1 | 6/2004 | Wasowicz |
| 2004/0117376 A1 | 6/2004 | Lavin et al. |
| 2004/0175679 A1 | 9/2004 | Wasowicz et al. |
| 2004/0229199 A1 | 11/2004 | Ashley et al. |
| 2004/0234936 A1 | 11/2004 | Ullman et al. |
| 2004/0267607 A1 | 12/2004 | Maddux |
| 2005/0003338 A1 | 1/2005 | Norcott et al. |
| 2005/0053905 A1 | 3/2005 | Sadler |
| 2005/0055412 A1 | 3/2005 | Kaminsky et al. |
| 2005/0102569 A1 | 5/2005 | Wu et al. |
| 2005/0164153 A1 | 7/2005 | Beatty et al. |
| 2005/0191609 A1 | 9/2005 | Fadel et al. |
| 2005/0227216 A1 | 10/2005 | Gupta |
| 2005/0251363 A1 | 11/2005 | Turner et al. |
| 2005/0268171 A1 | 12/2005 | House et al. |
| 2005/0287509 A1 | 12/2005 | Mohler |
| 2006/0003306 A1 | 1/2006 | McGinley et al. |
| 2006/0014129 A1 | 1/2006 | Coleman et al. |
| 2006/0035205 A1 | 2/2006 | Dobson |
| 2006/0101459 A1 | 5/2006 | Crosier et al. |
| 2006/0112165 A9 | 5/2006 | Tomkow et al. |
| 2006/0177803 A1 | 8/2006 | Pennington et al. |
| 2006/0190871 A1 | 8/2006 | Likovich et al. |
| 2006/0199165 A1 | 9/2006 | Crowhurst et al. |
| 2007/0040889 A1 | 2/2007 | Sahashi |
| 2007/0083423 A1 | 4/2007 | Delbridge |
| 2007/0099167 A1 | 5/2007 | Eason |
| 2007/0107061 A1 | 5/2007 | Engle et al. |
| 2007/0124726 A1 | 5/2007 | Qureshi et al. |
| 2007/0220492 A1 | 9/2007 | Brugiolo et al. |
| 2007/0281287 A1 * | 12/2007 | Marioneaux, Jr. ............ 434/353 |
| 2008/0050715 A1 * | 2/2008 | Golczewski et al. ........ 434/350 |
| 2008/0096176 A1 | 4/2008 | Rogers et al. |
| 2008/0096178 A1 | 4/2008 | Rogers et al. |
| 2008/0096179 A1 | 4/2008 | Rogers et al. |
| 2008/0096180 A1 | 4/2008 | Rogers et al. |
| 2008/0096181 A1 | 4/2008 | Rogers et al. |
| 2008/0102430 A1 | 5/2008 | Rogers et al. |
| 2008/0102431 A1 | 5/2008 | Rogers et al. |
| 2008/0102432 A1 | 5/2008 | Rogers et al. |
| 2008/0102434 A1 | 5/2008 | Rogers et al. |
| 2008/0102436 A1 | 5/2008 | Rogers et al. |
| 2008/0102437 A1 | 5/2008 | Rogers et al. |
| 2008/0104618 A1 | 5/2008 | Rogers et al. |
| 2008/0108038 A1 | 5/2008 | Rogers et al. |
| 2008/0108039 A1 | 5/2008 | Rogers et al. |
| 2008/0108040 A1 | 5/2008 | Rogers et al. |
| 2008/0133964 A1 | 6/2008 | Rogers et al. |
| 2008/0254435 A1 | 10/2008 | Rogers et al. |
| 2008/0276174 A1 | 11/2008 | Hintermeister et al. |
| 2009/0226873 A1 | 9/2009 | Rogers et al. |
| 2009/0233264 A1 | 9/2009 | Rogers et al. |
| 2010/0055659 A1 | 3/2010 | Rogers et al. |
| 2012/0122068 A1 | 5/2012 | Rogers et al. |
| 2012/0264100 A1 | 10/2012 | Rogers et al. |
| 2013/0029310 A1 | 1/2013 | Rogers et al. |

OTHER PUBLICATIONS

"U.S. Appl. No. 11/877,280, Non-Final Office Action mailed Aug. 5, 2008", OARN,7 pgs.

"U.S. Appl. No. 11/877,398, Non-Final Office Action mailed Aug. 5, 2008", OARN,7 pgs.

"U.S. Appl. No. 11/877,411, Non Final Office Action mailed Aug. 11, 2008", OARN,7pgs.

"U.S. Appl. No. 11/853,495, Non-Final Office Action mailed Sep. 25, 2009", 3.

"U.S. Appl. No. 11/853,463, Non-Final Office Action mailed Nov. 9, 2009", 12 Pgs.

"U.S. Appl. No. 11/877,385, Final Office Action mailed Dec. 8, 2009", 9 Pgs.

"U.S. Appl. No. 11/877,351, Final Office Action mailed Dec. 9, 2009", 7.

"U.S. Appl. No. 11/877,440, Final Office Action mailed Dec. 9, 2009", 6.

"U.S. Appl. No. 11/877,411,Final Office Action mailed May 28, 2009", 10 pgs.

"U.S. Appl. No. 11/877,428, Non-Final Office Action mailed Jun. 16, 2009", 12 pgs.

"U.S. Appl. No. 11/877,460, Non-Final Office Action mailed Jun. 24, 2009", 13 Pgs.

"U.S. Appl. No. 11/877,428 Final Office Action mailed Jan. 9, 2009", 13 pgs.

"U.S. Appl. No. 11/877,351, Non-Final Office Action mailed Mar. 19, 2009", OARN.

"U.S. Appl. No. 11/877,440 Non-Final Office Action mailed Mar. 19, 2009", OARN,9 pgs.

"U.S. Appl. No. 11/877,372 Non-Final Office Action mailed Mar. 19, 2009", OARN,9 pgs.

"U.S. Appl. No. 11/877,385 Non-Final Office Action mailed Mar. 19, 2009", OARN.

"U.S. Appl. No. 11/877,385, Non-Final Office Action mailed Apr. 28, 2010", , 2.

"U.S. Appl. No. 11/853,463, Final Office Action mailed Apr. 7, 2010", , 10.

"U.S. Appl. No. 11/853,495, Final Office Action mailed Mar. 31, 2010", , 3.

"U.S. Appl. No. 11/853,601, Non-Final Office Action mailed Aug. 26, 2010", , 19.

"U.S. Appl. No. 11/853,608, Non-Final Office Action mailed Sep. 23, 2010", , 17.

"U.S. Appl. No. 11/853,543, Non-Final Office Action mailed Sep. 29, 2010", , 19 pgs.

"U.S. Appl. No. 11/877,351, Non-Final Office Action mailed Feb. 11, 2011".

"U.S. Appl. No. 11/877,385, Non-Final Office Action mailed Dec. 22, 2010", , 12.

"U.S. Appl. No. 11/877,440, Non-Final Office Action mailed Feb. 8, 2011", , 12.

(56) References Cited

OTHER PUBLICATIONS

"U.S. Appl. No. 11/853,601, Final Office Action mailed Feb. 16, 2011", , 13.
"U.S. Appl. No. 11/853,608, Final Office Action mailed Feb. 16, 2011", , 12.
"U.S. Appl. No. 11/877,428, Final Office Action mailed Dec. 23, 2010", , 20.
"U.S. Appl. No. 11/877,372, Notice of Allowance mailed Jan. 19, 2010", , 8.
"U.S. Appl. No. 12/470,840, Non-Final Office Action mailed Mar. 13, 2005", , 15.
"U.S. Appl. No. 11/877,460, Final Office Action mailed Feb. 2, 2010", , 12.
"U.S. Appl. No. 11/853,560, Final Office Action mailed Apr. 1, 2011", , 15.
"U.S. Appl. No. 11/853,478, Non-Final Office Action mailed May 11, 2011", , 22.
"U.S. Appl. No. 12/470,840, Non-Final Office Action mailed Apr. 4, 2011", , 9.
"U.S. Appl. No. 12/470,913, Non-Final Office Action mailed Mar. 31, 2011", , 16.
"U.S. Appl. No. 12/551,764, Non-Final Office Action mailed Mar. 31, 2011", , 15.
"U.S. Appl. No. 11/853,560, Non-Final Office Action mailed May 26, 2010", , 17.
"U.S. Appl. No. 11/877,351, Non-Final Office Action mailed May 26, 2010", , 11.
"U.S. Appl. No. 11/877,440, Non-Final Office Action mailed May 25, 2010", , 4.
"U.S. Appl. No. 11/853,445, Non-Final Office Action mailed Nov. 5, 2010".
"U.S. Appl. No. 11/853,463, Notice of Allowance mailed Oct. 18, 2010", , 4 pgs.
"U.S. Appl. No. 12/470,840,Final Office Action mailed Oct. 8, 2010", , 17.
"U.S. Appl. No. 11/853,445, Non-Final Office Action mailed Aug. 24, 2011", , 11.
"U.S. Appl. No. 12/470,840, Final Office Action mailed Oct. 3, 2011", , 14.
"U.S. Appl. No. 11/853,495, Non-Final Office Action mailed Feb. 14, 2012", 11853495-58, 18 pages.
"U.S. Appl. No. 11/853,543, Non-Final Office Action mailed Apr. 13, 2012", 11853543-60, 18 pages.
"U.S. Appl. No. 11/877,440, Notice of Allowance mailed Mar. 6, 2012", 8 pages.
"U.S. Appl. No. 11/853,445, Final Office Action mailed Mar. 29, 2012", 17 pages.
"U.S. Appl. No. 11/853,619, Final Office Action mailed Feb. 28, 2012", 15 pages.
"U.S. Appl. No. 13/358,956, Notice of Allowance mailed Jun. 27, 2012", , 22.
"U.S. Appl. No. 11/877,351, Final Office Action mailed Jul. 5, 2011", , 15.
"U.S. Appl. No. 11/853,543, Non-Final Office Action mailed Jun. 8, 2011", , 12.
"U.S. Appl. No. 11/853,619, Non-Final Office Action mailed Jun. 14, 2011", , 21.
"U.S. Appl. No. 11/877,385, Final Office Action mailed Jun. 8, 2011", , 10.
"U.S. Appl. No. 12/470,913 Final Office Action mailed Jul. 27, 2011", , 14.
"U.S. Appl. No. 12/551,764 Notice of Allowance mailed Nov. 1, 2011", , 15 Pages.
"U.S. Appl. No. 11/853,478, Final Office Action mailed Oct. 27, 2011", , 17.
"U.S. Appl. No. 11/877,440, Final Office Action mailed Oct. 19, 2011", , 13 Pgs.
"U.S. Appl. No. 11/853,495, Non-Final Office Action mailed Sep. 19, 2012", Sep. 19, 2012 , 15 pgs.
"U.S. Appl. No. 11/853,495, Non-Final Office Action mailed Oct. 8, 2013", 12 pages.
"U.S. Appl. No. 11/853,543, Final Office Action mailed Nov. 20, 2013", 13 pages.
"U.S. Appl. No. 11/853,543, Non-Final Office Action mailed May 6, 2013", 19 pages.
"U.S. Appl. No. 13/626,671 Final Office Action mailed Dec. 12, 2012", 18 pgs.
"U.S. Appl. No. 11/853,495, Final Office Action mailed May 16, 2013", 17 pages.

* cited by examiner

FIG. 9A vocab99

Click on a number to check your work.  OR  Click I'M DONE.
— 1002

[?] 1. gift
[?] 2. escape
   — 1008
[?] 3. main
   — 1004

My work: ▮▮▮▮▯▯▯ 3 questions in all
My time: ▮▮▮▯▯▯▯ 20 minutes in all (I NEED HELP)

[?] = not answered (I'M DONE)
— 1010

Demo Student11

Thank You!

Gmrt 4 On-line
Form S – Level 4
Acknowledgments
Practice Questions:
Excerpt from *The Moon and You* by E.
C. Krupp and Robin Rector Krupp.
Copyright © 1993 by E. C. Krupp and
Robin Rector Krupp. Reprinted with
permission.

Questions 1-3:
Excerpt from *Talk About a Family*
by Eloise Greenfield. Copyright © 1978
by Eloise Greenfield. Reprinted with
permission of the Nancy Galt Agency.

Questions 4-6:
Excerpt from *Fire and Silk: Flying in a
Hot Air Balloon* by Neil Johnson.
Copyright © 1991 by Neil Johnson.
Published by Little, Brown and
Company. Reprinted with permission of
Neil Johnson, c/o Mary Jack Wald
Associates, Inc.

Questions 7-12:
Excerpt from *How My Parents Learned
to Eat* by Ina R. Friedman. Copyright ©

DYNAMICALLY PRESENTING PRACTICE SCREENS TO DETERMINE STUDENT PREPAREDNESS FOR ONLINE TESTING

CROSS-REFERENCE TO RELATED APPLICATIONS

This application claims the benefit of the following provisional applications, each of which is hereby incorporated by reference in its entirety:

U.S. Provisional App. No. 60/825,246 filed on Sep. 11, 2006; and

U.S. Provisional App. No. 60/941,984 filed on Jun. 5, 2007.

BACKGROUND

1. Field

This invention generally relates to computerized testing using a networked platform, such as the Internet, and it more specifically relates to determining student preparedness for testing.

2. Description of Related Art

Computerized testing has advantages over written testing such as efficiency and reduction in paperwork. However, computerized testing systems can be improved to provide a substantially better testing environment for the student with greater control and interactivity by those administering tests.

A need exists for improved computerized testing and testing administration methods and systems.

SUMMARY

Provided herein are methods and systems for an online test platform.

In an aspect of the invention, a method include logging a test taker into an online testing platform prior to beginning an online test; using a web browser in association with a computing facility; placing the test taker in a virtual waiting room following the login; presenting the test taker a practice test question while in the virtual waiting room; polling the web browser to obtain data relating to a performance criterion of the test taker in association with the practice test question; analyzing the data in association with a performance rule; and determining a preparedness level of the test taker to take a test based at least in part on a result of the analysis.

In another aspect of the invention, methods and systems include providing a networked computing facility and an interface, such as a web browser, executing on the computing facility for participating in a test session of an online test platform, and restricting use of the computing facility to participating in the online test platform during the test session.

In the methods and systems, the web browser may be secure. A user participating in the online test session may be an administrator of the computer. In the methods and systems, a proctor of the online test platform may lift the restriction, and a user of the computer may request to stop participating in the online test session. The request may be a signal from the computer to a proctor of the online test platform.

In another aspect of the invention, methods and systems may include providing a server connected through the internet with a client computer to deliver an online test, displaying a test screen of the online test on the client computer, receiving, at the client computer, test screen update information from the server, and assembling a next test screen while displaying a current test screen.

In the methods and systems, receiving data may overlap with displaying data. The methods and systems may further include displaying the next test screen immediately after a user has completed the current test screen. Assembling may occur after a user has completed the current test screen. Displaying the next test screen may immediately occur after assembling the next test screen.

In another aspect of the invention, methods and systems may include providing a server connected through the internet with a plurality of client computers to deliver an online test, providing an adjustable polling period, setting the polling period based on an aspect of the online test, polling at least one of the plurality of client computers by the server at least once per polling period, and maintaining on the server a record of the client computer status associated with the delivery of the online test.

In the methods and systems, setting may include sending the polling period to the client. The record may include the polling period, the polling period may be set by the server.

In the methods and systems, an aspect of the online test may include a number of client computers connected to the server or the number of client computers participating in the online test delivery. The record may include test results provided by the client computer.

In another aspect of the invention, methods and systems may include providing a test center with a plurality of computers, providing a plurality of test takers, each using a computer in the test center, communicating test information over the internet between a server and a web browser of each computer being used by a test taker, and independently testing each test taker in the test center over the internet.

The methods and systems may include providing a proctor of the test using a computer in the test center. The proctor may communicate over the internet to test takers through the server. The proctor may view the status of at least some of the test takers visually or over the internet. The proctor may be remotely located.

In another aspect of the invention, methods and systems may include providing a summary screen of answers to an online test session, selecting an answer on the summary screen, displaying a review screen of the selected answer, updating the selected answer on the review screen, and displaying the summary screen of test answers with the updated selected answer. In the methods and systems the updated selected answer may be the answer chosen during the test session.

In another aspect of the invention, methods and systems may include providing a networked computer, providing a web browser executing on the computer, assembling test screen animations in real-time based on test information provided by a server connected to the computer over the internet, and displaying the test screen animations to deliver an online test. In an embodiment, the test screen animation may be assembled in real time the first time that day that the test may be requested. After that, if the test has not changed, the students who request that same test may be able to load a cached, compiled version of the test screen animation. Determining if a test may have changed may involve running a check against the version that was compiled and an updated flag in the database.

In embodiments, a proctoring interface may be associated with an online test platform. In embodiments, a proctoring interface may be provided that includes welcome and proctoring screens. A proctor or plurality of proctors may be able to select a current time frame of tests on a welcome screen of the proctoring interface.

In embodiments, a proctor or plurality of proctors may be able to open a test session of one of a plurality of tests displayed in a test display area of the proctor welcome screen In embodiments, a proctor or plurality of proctors may be able to start an open test session by selecting a start session control of the proctoring user interface.

In embodiments, a proctoring screen may be displayed that is associated with a started test. The proctoring screen may include a header and a plurality of test status panels. A start test status panel may display a plurality of selectable individual controls for a plurality of test takers;

In embodiments, a proctor or plurality of proctors may activate one or more of a plurality of test takers to begin testing by selecting an activation control for each of the plurality of test takers individually, or by selecting a general start control displayed in the header to activate all online test takers that are displayed in the start test status panel.

In embodiments, a proctor or plurality of proctors may display individual controls for test takers by opening a testing status panel.

In embodiments, the proctoring interface may provide a plurality of organizational controls for organizing the content within the proctoring interface, such as the physical location of test takers in a test environment, grouping test takers within the interface based at least in part on testing status (e.g., "active," "complete"), grouping test takers within the interface based at least in part on each test taker's test or subject matter (e.g., "History Chapter 2 Test," "English Composition Test," etc.), grouping test takers within the interface based at least in part on test takers' needs and/or special needs, grouping test takers within the interface based at least in part on a level of proctoring assistance needed, or some other organizational framework.

In embodiments, a proctor or plurality of proctors may monitor the displayed individual test taker controls of the testing status panel to provide assistance to one or more test takers based at least in part on the one or more test takers requesting assistance. In embodiments, a proctor or plurality of proctors may finalize a test session by opening a finish test status panel to display individual completed test taker controls. A proctor may accept a test taker's answers individually by selecting each completed test taker control finalize button, or by selecting a finalize session control in the proctoring header, wherein finalizing may accept test takers' answers and prepare the answers for scoring. In an embodiment, selecting a finalize session control button may only finalize test taker's sessions that have been completed. In an alternate embodiment, if an individual test needs to be finalized, the proctor may click on the student icon from the proctor monitoring screen and select "Finalize" for that student.

In an aspect of the invention, a method of proctoring an online test may comprise providing a proctoring user interface that includes welcome and proctoring screens; selecting a current time frame of tests on the welcome screen; opening a test session of one of a plurality of tests displayed in a test display area of the proctor welcome screen; starting the open test session by selecting a start session control of the proctoring user interface; displaying a proctoring screen associated with the started test wherein the proctoring screen includes a header and a plurality of test status panels wherein a start test status panel is open displaying selectable individual controls for a plurality of students; activating one or more of the plurality of students to begin testing by selecting an activation control for each of the plurality of students individually or by selecting a general start control displayed in the header to activate all online students displayed in the start test status panel; displaying individual controls for students testing by opening a testing status panel; providing a plurality of organizational controls for organizing the content within the proctoring interface; monitoring the displayed individual testing student controls of the testing status panel to provide assistance to one or more testing students based at least in part on the one or more testing students requesting assistance; and finalizing the test session by opening a finish test status panel to display individual completed student controls and accepting student answers individually by selecting each completed student control finalize button or by selecting a finalize session control in the proctoring header, wherein finalizing accepts students answers and prepares the answers for scoring. In an embodiment, each of the steps of proctoring an online test is carried out online. In an embodiment, each of the steps of proctoring an online test is carried out on a combination of online and a locally installed server.

In an aspect of the invention, a method of polling includes logging a test taker into an online testing platform, using a web browser in association with a computing facility, and prior to beginning an online test with the test taker polling the web browser to obtain data relating to the computing facility. In the method, the data relating to the computing facility relates to functionality of the computing facility which is related to image resolution, audio capability, or video capability. In the method, the data relating to the computing facility characterizes polling response time of the computing facility. In the method, polling includes synchronous polling or asynchronous polling. The synchronous polling is based on a polling period so that the web browser is polled at least once per polling period. The polling period is predetermined, variable, or based on an aspect of the test taker.

In another aspect of the invention, the method further includes a plurality of web browser associated computing facilities, and polling each of the plurality of web browsers. In the method, polling comprises sequential or non-sequential polling of the plurality of web browsers, or polling a second web browser of the plurality of web browsers prior to obtaining data from a first web browser of the plurality of web browsers.

In another aspect of the invention a method includes logging a test taker into an online testing platform prior to beginning an online test, using a web browser in association with a computing facility, polling the web browser to obtain data relating to the test taker's progress, summarizing the data, and presenting the summarized data to the online testing platform to indicate the test taker's testing progress. In the method, the data relating to the test taker's progress is related to completion of a test question. In the method, the data relating to the test taker's progress represents a check of test taker status, test taker idle time, aspects of network connectivity between the online testing platform and the computing facility, or an indication of the test taker requesting a proctoring action. In the method, the summarized data is presented to the test taker or a proctor. In the method, the testing progress is based at least in part on a number of questions completed, a percentage of questions completed, a duration of time that has expired during a testing session, or a duration of time that remains in a testing session.

In another aspect of the invention, a method includes storing an indication of accommodations in a test taker profile, polling the test taker profile in order to determine the accommodations, and in response thereto using a dynamic animation compilation functionality to update the test taker's testing environment. In the method, the animation comprises Flash animation. In the method, the test taker profile is polled prior to the test taker starting a test or during a test. In the method, the test taker accommodation is determined during a test based at least in part on polling the test taker's testing environment. In the method, the test taker's testing environment includes images, audio, text, font size, volume, brightness, contrast, a time duration, a language, a calculator, or a virtual assistant. The virtual assistant is a text FAQ, an audio FAQ, or a help menu. The help menu is keyword searchable. In the method, the virtual assistant includes instant message communication with a proctor.

In another aspect of the invention, a method includes using a web browser in association with a computing facility for a test taker to begin testing within an online testing platform, determining a test taker accommodation based at least in part on polling the web browser during the testing, and using a dynamic FLASH compilation functionality to update the test taker's testing environment that is presented in the web browser. In the method, the test taker accommodation is determined during a test based at least in part on polling the test taker's testing environment. The test taker's testing environment includes images, audio, text, font size, volume, brightness, contrast, a time duration, a language, a calculator, or a virtual assistant. In the method, the virtual assistant is a text FAQ, an audio FAQ, or a help menu. The help menu is keyword searchable. In the method, the virtual assistant includes an instant message communication with a proctor.

In another aspect of the invention, a system for polling an online test facility includes an online testing platform for receiving a test taker login prior to a start of a test, a web browser in association with a computing facility, a server for polling the web browser, and data relating to the computing facility that is accessible through the web browser. In the system, the data relating to the computing facility relates to functionality of the computing facility. The computing facility functionality is related to image resolution, audio capability, or video capability. In the system, the data relating to the computing facility characterizes polling response time of the computing facility. In the system, the server for polling comprises the server for synchronous polling or asynchronous polling. In the system, the synchronous polling is based on a polling period. In the system, the polling period defines a minimum polling frequency. In the system, the polling period is predetermined or variable. The variable polling period is based on an aspect of the test taker.

In another aspect of the invention, the method further includes a plurality of web browser associated computing facilities. In the system, polling is sequential or non-sequential to each of the plurality of web browsers. In the system, the server polls a second web browser of the plurality of web browsers prior to obtaining data from a first web browser of the plurality of web browsers.

In another aspect of the invention a system includes an online testing platform for receiving a test taker login prior to beginning an online test, a web browser in association with a computing facility, and a server in communication with the online testing platform, the server for polling the web browser to obtain data relating to the test taker's progress and provide a summary of the data to the online testing platform, wherein the data summary indicates the test taker's testing progress. In the system, the data relating to the test taker's progress is related to completion of a test question. In the system, the data relating to the test taker's progress represents a check of test taker status, test taker, aspects of a network connectivity between the online testing platform and the computing facility, or an indication of the test taker requesting a proctoring action.

In another aspect of the invention, the system further includes the online test platform in communication with the test taker for presenting the data summary to the test taker, or to the proctor. In the system, the testing progress is based at least in part on a number of questions completed, a percentage of questions completed, a duration of time that has expired during a testing session, or a duration of time that remains in a testing session.

In another aspect of the invention, a system includes an indication of accommodations stored in a test taker profile, a test platform for polling the test taker profile in order to determine the accommodations, and a dynamic animation compilation functionality to update the test taker's testing environment based on the determined accommodations. In the system, the animation comprises Flash animation. In the system, polling the test taker profile comprises polling the test taker profile prior to the test taker starting a test, or during a test. In the system, the test platform is adapted for polling the test taker's testing environment during a test in order to determine at least in part the test taker's accommodations. The test taker's testing environment includes images, audio, text, font size, volume, brightness, contrast, a time duration, a language, a calculator, or a virtual assistant. The virtual assistant is a text FAQ, an audio FAQ, or a help menu. The help menu is keyword searchable. In the system, the virtual assistant is an instant message communication with a proctor.

In another aspect of the invention, a system includes a web browser in association with a computing facility for presenting a test taker's testing environment, an online testing platform for polling the web browser during the presentation of the testing environment to at least partially determine a test taker accommodation, and a dynamic FLASH compilation functionality to update the test taker's testing environment based on the determined accommodation. In the system, the test taker accommodation is determined based at least in part on the test taker's environment. In the system, the test taker's testing environment includes images, audio, text, font size, volume, brightness, contrast, a time duration, a language, a calculator, or a virtual assistant. In the system, the virtual assistant is a text FAQ, audio FAQ, or help menu. The help menu is keyword searchable. In the system, the virtual assistant comprises an instant message communication with a proctor.

These and other systems, methods, objects, features, and advantages of the present invention will be apparent to those skilled in the art from the following detailed description of the preferred embodiment and the drawings.

BRIEF DESCRIPTION OF THE FIGURES

FIG. 9A—depicts a comprehension test screen.

FIG. 10—depicts a summary screen for a vocabulary test.

FIG. 10A—depicts a summary screen for a comprehension test.

FIG. 11—depicts a test screen selected from the summary screen of FIG. 10.

FIG. 13A—depicts a scrollable credit screen of source credits associated with reading passages of the comprehension test screens.

DETAILED DESCRIPTION OF THE FIGURES

A test platform may facilitate the development, delivery, and management of educational tests. Such a platform may also facilitate interactive participation by students, teachers, proctors, and administrators even when some or all of them are remotely located. An online embodiment of the test platform may also gain advantage from various aspects of a distributed computing environment such as the Internet. Aspects such as open source software, standardized highly dynamic and flexible user interfaces, broadly compatible commercially available software (e.g. web browsers, browser add-ins, file systems and the like), and near-universal networking of computing servers and clients may facilitate integration and enhance management and far reaching delivery of tests.

Herein aspects of an online test platform will be described. Aspects may include system architecture of an embodiment of the online test platform, functionality and interactions among elements of the platform, operation of display screens through which test takers (e.g., students) may interact with the platform, methods of generating and updating the screens, and benefits of such a test platform.

The platform may include, for example, administrator interfaces, test proctor interfaces, and test taker (e.g., student) interfaces. These interfaces may be associated to allow each participant to view, navigate, and interact with aspects of the online test platform that are intended to meet their needs. In this way students may take advantage of test delivery and results review; administrators may take advantage of test construction, evaluation, and reporting; and proctors may take advantage of test execution and support of testing students. While these exemplary systems, methods and advantages are described, other systems, methods, advantages, capabilities and interfaces will be appreciated by one skilled in the art and are intended to be encompassed by the invention as described herein. For example, the online test platform may include a test developer interface, a regulatory interface, a teacher/educator interface, and the like.

Figure 1:
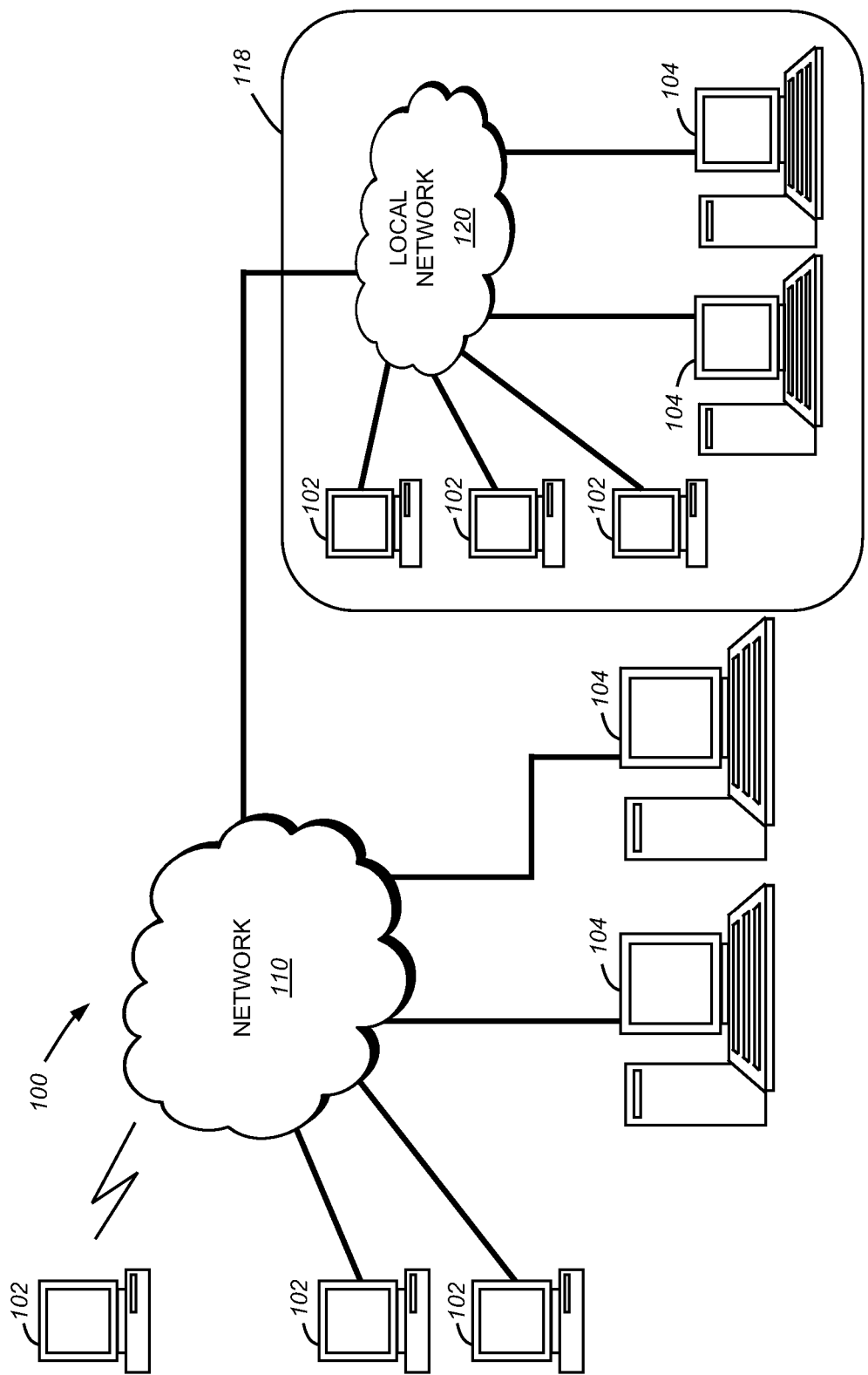
FIG. 1—depicts a general architecture of an online test platform.

Referring to FIG. 1, in a general architecture of an online test platform, user stations 102 may communicate with test servers 104 through an internetwork 108. Additionally, a test center 118 may include user stations 102 and servers 104 connected to a local network 120. Internetwork 108 and local network 120 may be connected so that servers 104 on either network may communicate with each other and with stations 102 on either network. Internetwork 108 and local network 120 may include intranets such as a school intranet, a school district intranet, a university intranet, a company intranet, a testing center intranet, a virtual intranet, and the like. The online test platform 100 facilitates a station 102 supporting a variety of users such as students, proctors, administrators, and the like. In this way, a station 102 may not need to be dedicated to a particular user or function. A test station 102 may be a computing facility such as a personal computer (e.g., desktop, laptop, palmtop, handheld, PDA, kiosk, etc.). A server 104 may also be a computing facility such as a personal computer, web server, database server, and the like. Students, proctors, administrators, and other users of the online test platform 100 may interact independently of their physical location through a networked aspect of the online test platform 100. The stations 102, servers 104, and networks 110, 120 depicted here are representative examples of elements of the online test platform 100 and as such, this configuration is exemplary in nature and should not be considered limiting the systems and methods described herein. Other computing facilities, wired and wireless networks, and the like that may communicate with a local network or the Internet are also included within the scope of embodiments of the online test platform 100.

A test taker may interact with the online test platform 100 by using a test station 102 that includes a web browser such as Microsoft IE, Foxfire, Opera, Safari, Netscape, or other software that enables a user to display and interact with text, images, videos, audio and other information that may be displayed in a web browser. The user may use the user interface of the station 102 to direct the station 102 web browser to a website of the online test platform 100 where the station 102 web browser may retrieve HTML, XHTML, or other web page display content and instructions. The instructions may include specific commands interpreted by the web browser that may check a configuration of the station 102. A configuration checking utility such as Browser Hawk from cyScape, Incorporated may perform the checking. The configuration check may include determining if software, operating systems, and/or web browser plug-ins that may facilitate using the online test platform 100 are installed on the station 102 and accessible to the web browser. An example of one such software and/or plug-in may be Adobe Flash software and web browser plug-in. If the configuration check determines some portion of software that may facilitate using the online test platform 100 is not installed or activated, the web browser may execute one or more instructions associated with the web page so that the software may be downloaded, installed, and activated on the station 102. The instructions may include automatically executing an installation program such as an install wizard on the station 102. The installation program may require interaction by the user to ensure a successful download and installation of the software.

The configuration check may include verifying software, hardware, network connections, and the like that may be required to allow the online test session to function properly. The network connection may be tested to ensure the connection bandwidth, availability, and protocol support are sufficient to transmit test information between the station 102 and a server 104. The configuration check may be initiated by a user logging into the online testing platform 100. Alternatively, the configuration check may be initiated by the station 102 accessing a URL, web page, or network address associated with a server 104 of the online testing platform 100, or accessing any aspect of an online test, such as a practice screen, a testing screen, a landing page, and the like. The check may be initiated each time the station 102 connects to the network. The check may further be initiated based on information accessible to the web browser such as a cookie, file, or other data element.

Preparing the station 102, which may include the configuration check for proper operation may include transferring software from a server, deactivating software currently available on the station 102, and the like.

A testing site 118 may include a plurality of servers 104 and a plurality of stations 102. In embodiments, the testing site allows the stations 102 to connect directly with an external network (e.g., the Internet) without the use of internal sever facilities. The site 118 support for tools such as JAVA, AJAX, FLASH, Browser Hawk, and the like may first be certified. For example, each station 102 may be certified by Browser Hawk at least the first time a user accesses the online test platform 100. The Browser Hawk may verify the station 102 each time the user accesses the online test platform 100. This level of certification provides the benefit of ensuring a test site 118 provides the required support so that, when users access the online test platform 100, the station 102 they are using is certified. This facilitates multiple users using the same station 102 from time to time and adding new stations 102 to the site 118.

Figure 2:
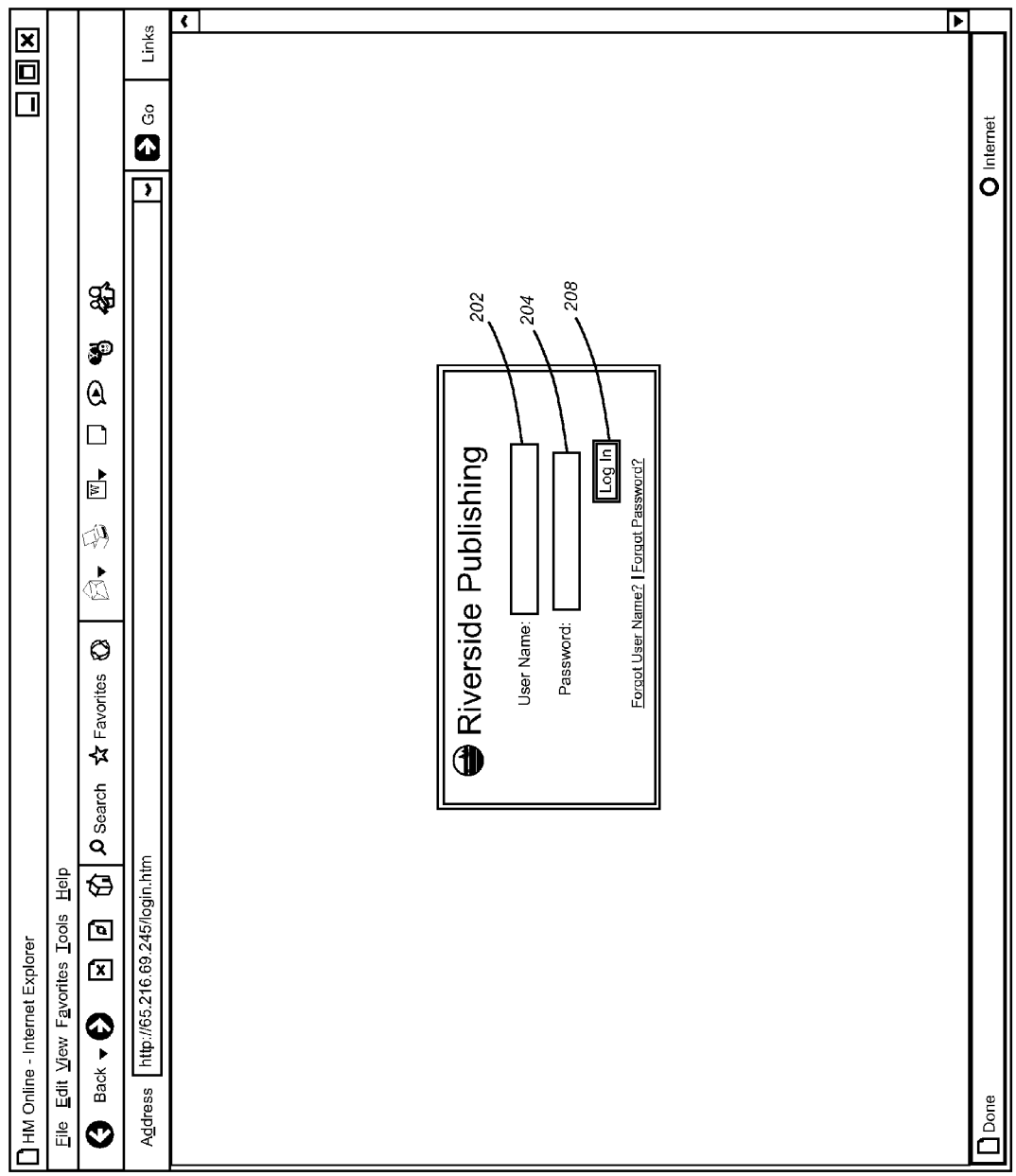
FIG. 2—depicts a login screen.

Upon completion of the download or a determination that the software is already downloaded, the web browser and associated software may display, within the web browser window on the station 102 display, a login screen such as that shown in FIG. 2. A user may select the User ID entry field 202 and enter a User ID. Likewise, the user may select the Password entry field 204 and enter a Password. The User ID and Password may be used to identify the user accessing the online test platform 100 when the user selects the Login button 208.

The software running within the web browser associated with the online test platform 100 may be a secure browser so that the user cannot use the station 102 for any other purpose until the testing is complete. Web browsers and stations 102 generally allow control function access such as "ALT-TAB" to select an alternate program and "CTL-C" and "CTL-V" for copy and pasting user selectable items. These exemplary control functions may be disabled by the online test platform 100 in the station 102 while the user is taking a test. In this way, the user cannot simply copy and paste answers or switch to another program such as a word processing program that may have answers to the questions.

Printing may be restricted in a test taker station 102 and in a proctor station so that printing is restricted based on login security. Secure access to printing also may provide additional security to the content associated with the platform in that the content may not be printed without proper access. Additionally, FLASH movie technology may provide security benefits in that standard system functions available with computer operating systems cannot capture and print FLASH movies.

Using test presentation technology such as FLASH may eliminate or reduce requiring custom testing software programs loaded onto testing site servers, test stations, and the like. The online testing platform 100 may provide an effective, beneficial testing environment requiring a standard browser and standard support for FLASH movie display within the browser.

By executing the HTML or equivalent instructions associated with selection of the Login button 208, the web browser may transfer the User ID and Password to a server 104 associated with the web page for validation and identification. The web browser may be configured to encrypt transfer of the information to provide security of the information while in transit to the server 104. Alternatively, the HTML instructions may explicitly encode or encrypt the information.

If the User ID and Password are known to the server 104, the server 104 may associate the current user's use of the online test platform 100 with a record of the user that may be stored in a database. The record stored in the database may include information necessary to facilitate providing test questions relevant to the user, such as questions based on a level of experience or training completed by the user. In an example, the user may be associated with a particular grade, class, language, training course, and the like that may have associated with it one or more questions that may be presented to the user. The user may be validated to proceed with the online test platform 100.

If the User ID and Password are not known to the server 104, the server 104 may provide a signal to the web browser that may be interpreted by the web browser to display a message to the user. The message may include an offer to the user to re-enter the User ID and/or Password. The message may include an offer to the user to register with the online test platform 100 to establish a record to be stored in the database and associate the record with the entered User ID and Password so that the user may be validated to proceed with the online test platform 100.

A validated user may initiate an online test platform 100 session wherein the server 104 associates the validated User ID with the specific station 102 and/or web browser through which the User ID and Password were entered. This may allow the server 104 to uniquely associate communication from the online test platform 100 session with a user record.

If the User ID and Password are known to the server 104, but an existing session is associated with the entered User ID, (e.g., there is currently another test taker accessing the online test platform 100 with the entered User ID and Password), the server 104 may signal the web browser to display an advisory alert to the user indicating the situation. The alert may include a selection for the user to reset the current login attempt or to continue with the entered User ID and Password. Continuing with the entered User ID and Password may cause the existing session associated with the entered User ID to be terminated. Alternatively, it may redirect communication associated with the existing session to the station 102 so that the user takes over the session at the point at which it was interrupted by continuing the login. In an example, a first user with User ID USER1 may be logged into online test platform 100 and may have answered questions #1 through #4 and question #4 is displayed in a web browser. A second user completes login with User ID USER1. Communication between the first user web browser and the server 104 is terminated so that the first user is logged out. The web browser of the second user displays question #4 instead of question #1. This may be useful in recovering from an interruption in communication of the USER1 session, such as a computer crash.

Figure 3:
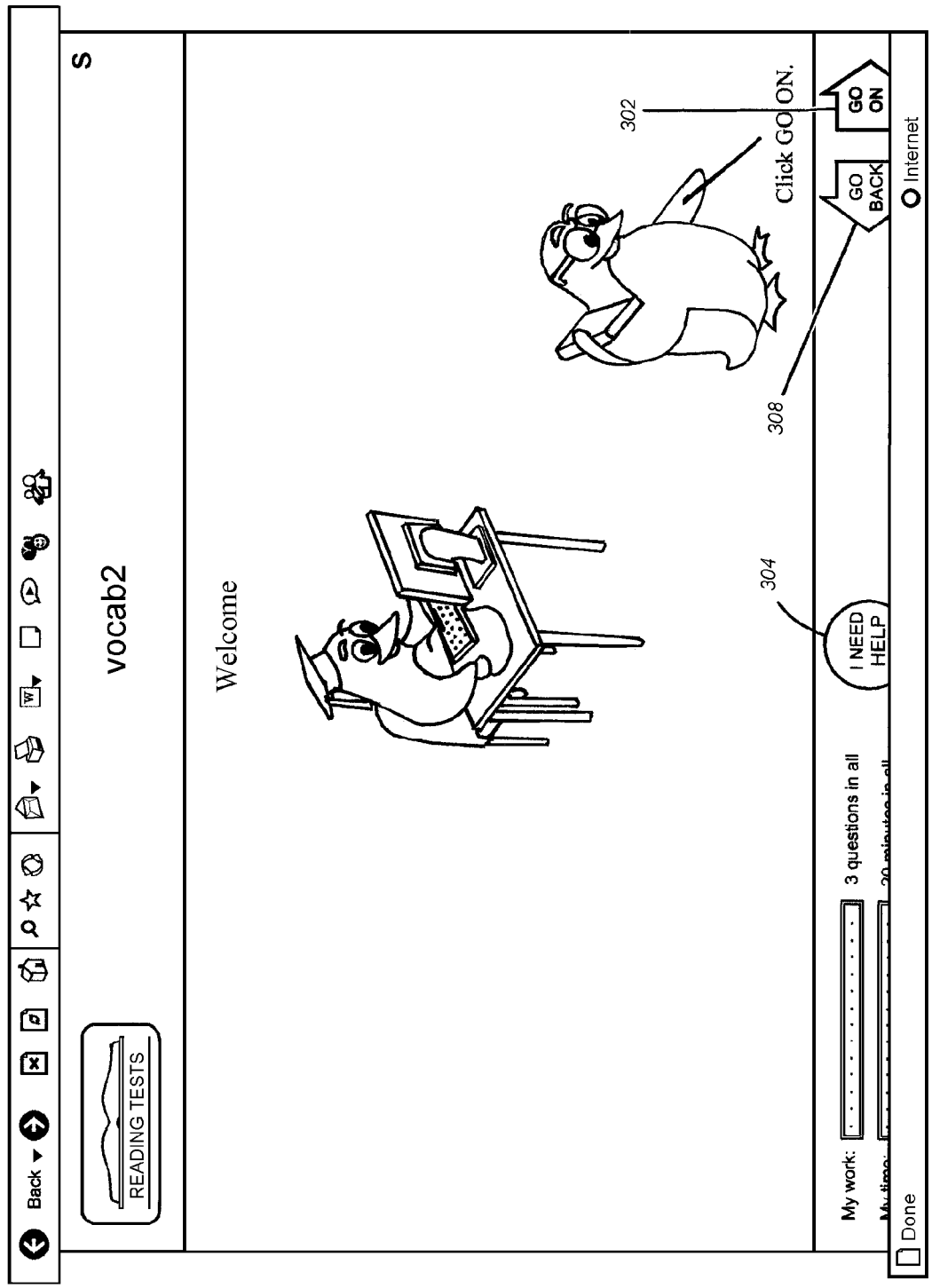
FIG. 3—depicts a welcome screen.

Once the user has been validated, the server 104 may communicate with the web browser so that additional HTML instructions may be provided to display a welcome screen such as shown in FIG. 3. The welcome screen may provide a GO-ON 302 selectable icon to proceed with the online test platform 100. The welcome screen may also provide one or more HELP 304 selectable icons for receiving HELP 304 with aspects of the online test platform 100.

The web browser used to access the online test platform 100 may communicate with the server 104 using asynchronous data transfer (such as HTTP requests) between the browser and the server 104. This may facilitate timely transmitting user input data and other data related to an online test platform 100 session to the web server 104. It also facilitates faster updates of the online test platform 100 display in the web browser by supporting partial updates of the displayed web page when the server 104 sends data and/or updates information to the web browser. One example of such asynchronous data transfer software that couples with web browsers is AJAX (Asynchronous JavaScript And XML). AJAX is based on open standards such as JavaScript, XML, HTML, and CSS. Therefore the online test platform 100 may be supported by all major web browsers and may be platform independent.

During a user session of the online test platform 100, the server 104 may be polled by the web browser, such as to determine the current screen to be displayed to the user. The frequency of polling may be configurable, such as by an administrator of the online test platform 100. A default polling frequency may be 30 seconds, yet it may be adjusted down or up for purposes such as reducing network traffic per user in configurations with many simultaneous users of the system, or decreasing system response time.

The server 104 may be polled to determine where a test taker, such as a student is in the test and whether the proctor has changed anything such as added time, paused the test, stopped the test, invalidated the session, and other test session related actions. The server 104 and/or the station 102 may log polling related activity. Determining where the student is in the test may facilitate the server 104 providing the information, such as questions, reading text, and the like, for the next screen to be displayed when the user selects GO-ON 302. Next screen information may be maintained by the server 104 and by the station 102, such as by the station 102 web browser. The server 104 and or the user's web browser may record and log this information. This information may be useful in tracking a user's progress through the online test platform 100 and may allow the server 104 or the web browser to track aspects of a user's performance such as aspects related to time. Recording and logging aspects such as how long a question is displayed to a user before the user answers the question, how many changes to an answer choice a user makes before submitting the answer, and the like may be useful in evaluating aspects of the user, the question, and or the online test platform 100. This information may also be useful in improving the performance of the online test platform 100 by allowing the server 104 to download information that may be used to generate the next screen. In this way, although the information is passed between the server 104 and the user's web browser throughout the testing, the user may perceive the test as executing rapidly as it would if it were running locally on the station 102.

The server 104 may poll the user station 102, such as to record user actions detected through the user interface of the online testing platform 100. User input information that is collected by a web browser typically is delivered to a web server through the submission of a web form. A web form may be displayed in a user friendly format such as on a web page to facilitate a user entering the information in the form, or the form may be generated dynamically when a user issues a submit type command in a web page. However, this approach may not provide sufficient and timely information about a student or test taker interacting with an online testing session. Therefore, the platform 100 supports polling to collect user interaction with the online testing session in a more timely and useful manner than web form submission. Polling allows updating a server 104 without the test taker or user requesting that information provided by the user be submitted to the server. Polling also allows a server 104 to respond to user conditions more dynamically than using web forms. Polling also may allow a server 104 or a proctor to monitor user activity and react to that activity. In an example, a user may have selected a response to a test question but may not have selected to submit the response. Through polling the user's inputs, a test proctor may determine which response the user has selected and may make a suggestion or provide guidance to the user. In another example of polling, the server 104 may detect (at the next polling interval) that a user has selected a help icon of the online test platform 100 user interface.

The user station 102 may poll the server 104 as herein described to retrieve additional information relating to the presentation of the test screens to the user of the station 102. The web page, such as a FLASH program, presented to the user through the user web browser may include periodic polling of the server to retrieve screen update information. This may be beneficial when a proctor of an online test session takes some action that impacts online test takers participating in the test session. In an example, a proctor may take an action that would cause the test to pause after the user completes the current test question. Through the station 102 polling the server 104 while the user is evaluating the current test question, the web browser may display an indicator or otherwise alert the user of the pending proctor action. The web page displayed in the station 102 web browser may present the indicator to the user after receiving new display instructions, such as compiled FLASH code or HTML code, after receiving a completely new web page, instructions to modify the loaded web page being displayed, and the like.

Servers 104 may independently poll stations 102 and stations 102 may independently poll servers 104, polling may be coordinated, or polling may only occur from server 104 to station 102 or from station 102 to server 104. Polling behavior may change based on conditions related to the test session, the server 140, the station 102, the network or networks associated with the testing session, and the like. In an example, polling of the server 104 may be suspended when a user is reading instructions. In another example, station 102 polling frequency may be increased when the web page displayed includes a large number of potential actions to be taken by the user.

Polling further facilitates diversification of networking schemes associated with an online testing session. Polling may facilitate allowing a proctor to monitor a test taker even if the test taker and the proctor are using stations 102 that are associated with distinct local computer networks, or the stations 102 are connected to networks supported by different network providers. Polling may facilitate a server 104 monitoring a station 102 (or a station 102 monitoring a server 104) even if the station 102 and the server 104 are associated with networks supported by different network providers.

Polling further supports other functions associated with an online testing platform 100, such as tracking progress. Tracking test progress may include determining the number of test questions completed, a percentage of questions completed, test session duration, test session time remaining, or a combination of these (e.g. time per completed question) and other data associated with the platform 100, server 104, station 102, proctor, test taker, network, testing facility, and the like. Detecting, collecting, recording, and reporting user idle time may be facilitated by polling.

Determining interruptions in connectivity between a server 104 or proctor and a test taker station 102 may be facilitated by polling. The platform may include a plurality of servers 104 so that in the event of an interruption of in connectivity between a server 104 and a station 102, the station may determine that the connection has been interrupted and initiate polling with another server 104. Because information about the current testing session with a station 102 may be stored by a test server 104 on a network file server, the alternate test server may pick up service of the test session automatically. Additionally, servers 104 may exchange information about test sessions to facilitate automated switch over, backup, load distribution, and the like. Polling may allow a server 104 to determine if a test session communication has been interrupted. If communication to the station 102 is reestablished, the server 104 may poll the station 102 and determine it has resumed the test session with another server 104.

To further facilitate reducing interruptions in testing sessions, the station 102 may record all pertinent information about the test session that may allow the station 102 to initiate a connection with an alternate server 104 to resume an interrupted test session. However, local storing of test information may require rigorous security to ensure that the locally stored information cannot be extracted from the station 102. Therefore, storing test information associated with an instance of an on-line test session on a server 104 and identifying the information with a unique identifier, such as a test number may facilitate secure recovery. Putting serialized XML information on each station 102 may be subject to security threats in that a sophisticated intruder may de-serialize the XML and figure out the serialization and other algorithms that may allow access to the supposedly secure data on the station 102. Providing a separate piece of security communication hardware with each station 102, a group of stations 102, or with a testing site increases costs over a server based platform.

Communication between a server 104 and a station 102 may be adapted to facilitate high quality recovery of an interrupted test session. The communication may include prioritizing communication data packets to increase the quality of recovery. Data packets may be sized to increase the quality of a recovery (e.g. small packets may be used).

Detecting when a student has initiated an action requiring intervention by a proctor or server 104 may also be facilitated by polling. Polling may be beneficial to proctoring as described elsewhere herein. The platform may include functionality that summarizes data obtained through polling about a test taker or about a plurality of test takers. The summarized data may be presented to the test taker, a proctor, an administrator, a regulatory agency, a medical professional, and any other person, body, or organization. The summarized data may be usefully applied to ongoing use of the platform to improve performance, reduce cost, ease integration, ease use, and the like.

Polling may be synchronous, such as on a regular schedule, asynchronous, such as randomly timed, event based, and the like. Polling may be done in a sequential mode so that each user station 102 participating in a testing session may be polled in sequence. Polling may be performed so that the time between polling of a user station 102 may be less than a maximum time. Similarly, polling may be limited so that a user station may not be polled more frequently than a minimum time or not polled more than a maximum number of times per minute, hour, test session, and the like.

Polling frequency may be dynamically adjusted based on historical data. Analysis of historical data may indicate that polling more frequently during the first several questions of a test session than during the remainder of the test session is beneficial in that test takers are more likely to need help or get frustrated by long waits for help at the start of a session. In an example, polling by the server 104 may be limited to twice per minute of the first five questions of a test session, and once per minute for the next ten questions. Individual user historical behavior may be analyzed to determine an individual user polling profile. In an example, a student may have historically needed no help when answering math questions, but may have historically required help with word definition when answering reading comprehension questions. A polling profile for this example user could be adjusted based on the test question presented to the user.

The screens presented through the user's web browser may be generated by and include Macromedia FLASH content. The server 104 may maintain test assembly information (such as questions, sections of questions, sequence of questions, answers, and the like) in memory, online file storage, a local file system, a distributed file system, a (distributed) relational database or relational model, and other storage appropriate for storing and retrieving test assembly information. The screens and navigation control criteria may be compiled dynamically (on the fly) such as by using an open source dynamic compilation software system (e.g. OpenLaszlo from Laszlo Systems, Incorporated) to generate FLASH for the student screens using the stored test assembly information. This provides the advantage of not needing precompiled FLASH movies for every scenario. Each of the user interfaces and interactions described herein may be displayed using these display and interaction techniques.

The screens presented to the test taker through a web browser may be generated by assembling FLASH animations on-demand, such as when a student requests to take a particular test. On-demand FLASH animation allows the platform to store test assembly information rather than completed tests so that if a test is requested, the FLASH animation to present the test to the user may be compiled when needed. Each compiled instance of a test may be independently stored so that changes to the test assembly parts may not cause a compiled test instance to change while the test instance is being used by a student. This prevents changes to tests that are currently being taken and allows changes to be made dynamically so that the next test compilation request may include the changes. Because the test platform 100 may be web server based, stations 102 with different versions of FLASH installed may be requesting the same tests. On-demand test compilation facilitates compiling a test so that it may be compatible with a particular version of FLASH running on the station 102 requesting the test. This allows the platform to flexibly support a diversity of user environments without rigorously requiring each station 102 at each testing center, school, business, and the like to upgrade to a particular version of a required component such as FLASH. An on-demand sequence may include receiving a request for a test, drawing test assembly data from storage, compiling an appropriate version of the test using a dynamic animation compilation facility of the platform 100, and delivering the test to the station 102 web browser for presentation to the user.

Test compilation may be performed by a server 104, a station 102, or a combination of the server 104 and the station 102. Combined test compilation may provide benefits such as allowing the user or an intermediary such as a testing site proctor to select options and set preferences associated with the test session. The server 104 may compile a portion of the test and provide uncompiled portions (e.g. raw data) and the compiled portion to the station 102 or intermediary where the client preferences may be integrated into a final test compilation.

Test compilation may incorporate user or site preferences that may be provided to the server 104 when a test is requested. The server 104 may compile a test, such as a FLASH animation, that is responsive to the preferences (e.g. grade level, number of questions, and the like) and may store the compiled test. The server 104 may then respond to the test requester with a location of the compiled test (e.g. a URL or network address). The test requester, such as a user who has logged into the test platform, may take the test by directing a web browser to the location of the compiled test.

This dynamic compilation capability of the online test platform 100 facilitates adjusting a testing session to meet a user's specific needs, as would be required for a special needs student or a student with an individualized education plan. When the dynamic FLASH compilation capability is combined with server 104 polling, a user testing environment can be updated with accommodations while the user is taking the test by updating the FLASH running through the user's web browser at the next polling action. In an example, a user accommodation flag may be set in a user profile on the server 104 prior to a user logging into the online test platform 100 so that the test environment presented to the user may include flagged accommodations. Alternatively, it may be set at a later time dynamically during use of the online test platform 100, thereby providing the user accommodations such as different images, audio, font size, volume, display brightness or contrast, languages, use of a calculator, extended time, and the like that may be beneficial to the special needs student. Accommodations provided through the platform may include a virtual assistant that may include test based frequently asked questions, audio or video based frequently asked questions, instant messaging with a test proctor, a help menu such as a keyword searchable help menu, and the like. Technologies such as compiled FLASH, HTML or DHTML rendering of all test screen content may not provide the dynamic updating capability or responsiveness of the online test platform 100. Accommodations, such as those indicated based on a user profile, testing metadata, user preferences, a user request, training and/or practice question responses, and the like may be automatically provided. However, accommodations may only be provided if they are approved by a proctor of the online testing session. Therefore accommodation requests may follow a flow that includes presenting the accommodation requests to a proctor and authorization by the proctor before the accommodations are included in a dynamically compiled test animation.

Audio content may be included in an on-line test session and may be dynamically compiled with the visual portion of the test. Audio content may be greater for certain age groups such as young children (e.g. preschool, kindergarten, and the lower grades) who may not have mastered significant reading skills. The percent of audio content may be different and the content itself may be different. Audio cues may be embedded in training and/or practice screens, such as to facilitate determining a student's ability to interact successfully with the test platform 100. In an example, audio content may include audio instructions on how to answer a question.

Audio content may be streamed from the server 104 to the station 102, such as through an MP3 stream that may be facilitated by and coordinated with a FLASH animation of test screens to provide the audio in association with the test screens. Audio prompts may be included that relate to navigation or other aspects. In an example, a user may position a cursor of the user interface over an icon displayed in a test, training and/or practice screen and may hear an audio prompt such as the 'name' of the icon or the function the icon performs, or some other useful audio prompt.

Audio content may be integrated with displayed screens of the test platform, such as may be displayed during an on-line test session. An MP3 audio queue may be played based on a trigger provided by the platform 100. The trigger may be based on user input, such as user icon, navigation, button, or answer selection. The trigger may be based on the context of the test session, such as the screen presented, the next screen to present, the amount of time elapsed, the amount of time remaining, the number of questions answered, the number remaining, and the like. The audio content may be adapted based on user input, preferences, profile, and the like. In an example, two students may be taking the same exam and the primary language for one of the students may be Portuguese. The student profile may indicate the primary language difference and therefore the audio may include Portuguese instead of being completely in English. Adapting the audio may facilitate internationalization of the platform 100. In an example of audio content usage, a student may position a user interface cursor over a displayed prompt, such as a text portion or text answer, and the platform may play audio content associated with the prompt. In the example the user may listen as the platform 100 reads a question and reads each answer. The test platform 100 may respond to a user selecting an answer by playing audio content associated with the answer. In another example, a user may select a word, such as by clicking on a word (or double clicking) or by providing some other input, and the compiled test session may respond by pronouncing the word. In another example, a user may select a help icon and an audio response such as "please ask for help" may be played through the station 102 audio interface.

Audio content, such as MP3 audio content, may be presented in cues. Each MP3 audio cue may be a separate file that is provided to the station, or compiled into the FLASH animation. Common audio prompts, such as navigation prompts, may be provided to the station, but may not be complied into each test screen FLASH. Instead, the FLASH may activate a MP3 file or cue on the station 102 and the MP3 audio may play through third party MP3 audio player functionality. MP3 audio content may be configured as cues that may be concatenated into words, sentences, and the like. FLASH animation may activate each cue so that a sequence of cues may result in a proper pronunciation of a word. A cue sequence may be determined for each word so that the proper sound of letters with multiple pronunciations may be provided. The cues and/or concatenation of cues may be compiled on the fly based on the particular text present in the test screen.

Navigation from one test screen to the next/previous test screen may be supported by two or more navigation icons, such as GO-ON 302 and GO-BACK 308. GO-ON 302 may be activated when the user has completed the necessary aspects of the test of the current screen to proceed to the next test screen (e.g. the next test question). The GO-ON 302 button may be deactivated when the online test platform 100 determines that the user must complete a required portion of the current test screen before proceeding to the next test screen. The GO-BACK 308 button may be activated by the online test platform 100 to allow a user to return to a previous test screen. The GO-ON 302 and GO-BACK 308 buttons may be visually indicated as being disabled by being displayed in a low contrast and/or in a color (such as gray) other than the color when it is active. By disabling the GO-ON 302 and GO-BACK 308 buttons, the online test platform 100 visually indicates to users that they must complete some actions on the current test screen before navigating to another test screen. Navigation buttons may include logic or rules that may affect how the platform responds to a user clicking a navigation button. The rules may prevent a user from effectively skipping through a test question unintentionally by clicking the GO-ON 302 button too quickly. The logic/rules may be associated with the dynamic compilation of test screens. In an example, after a user selects the GO-ON 302 button, the button may not accept another user click until the next screen is displayed for a minimum amount of time, such as 1 second. In another example, the rules/logic may display a prompt, to which the user must respond, if the user selects to go-on when the platform detects that the user cursor has not been moved off of the GO-ON 302 icon since the last click of the GO-ON 302 icon and the user did not previously answer the question displayed on the test screen that appears after the last click of the GO-ON 302 icon.

Navigation functionality associated with training, practice, test, or administrative screens of the on-line test platform 100, may be applied to proctor, administrator, and other user screens of the platform 100.

The online test platform 100 may display a HELP 304 button on any screen, such as a welcome screen, a test screen, a practice screen, a confirmation screen, or a summary screen. Selecting the HELP 304 screen may provide instructions or other guidance to a user who may need HELP 304 interacting successfully with the currently displayed online test platform 100 screen.

The online test platform 100 may be presented to the user in a sequence of screens with which the user may use a web browser to interact. The sequence of screens may be based at least in part on user input such as selection of an answer, a HELP 304 button, a GO-ON 302 button or a GO-BACK 308 button, and the like. The user may be presented with one or more of these or similar navigation buttons based at least in part on an aspect of the current status of the user's interaction with the online test platform 100. Other navigation buttons that may be provided to the user include I'M-DONE, which may be presented to the user after the user has navigated through each of the test screens. A CHECK-MY-WORK button may be presented to the user when a user has selected to review an answer from a confirmation screen.

Figure 4:
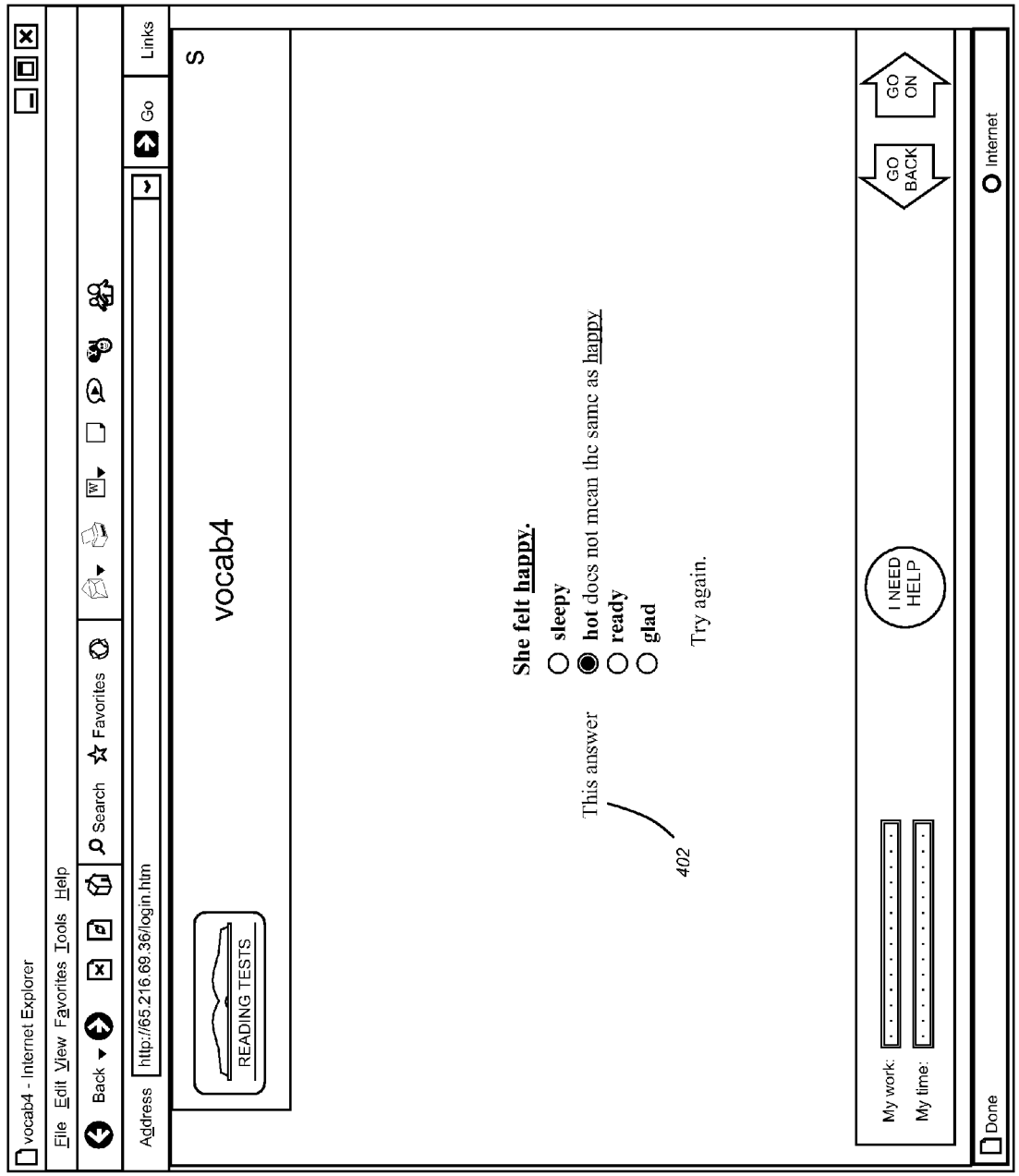
FIG. 4—depicts a practice screen with a wrong answer and feedback.
Figure 5:
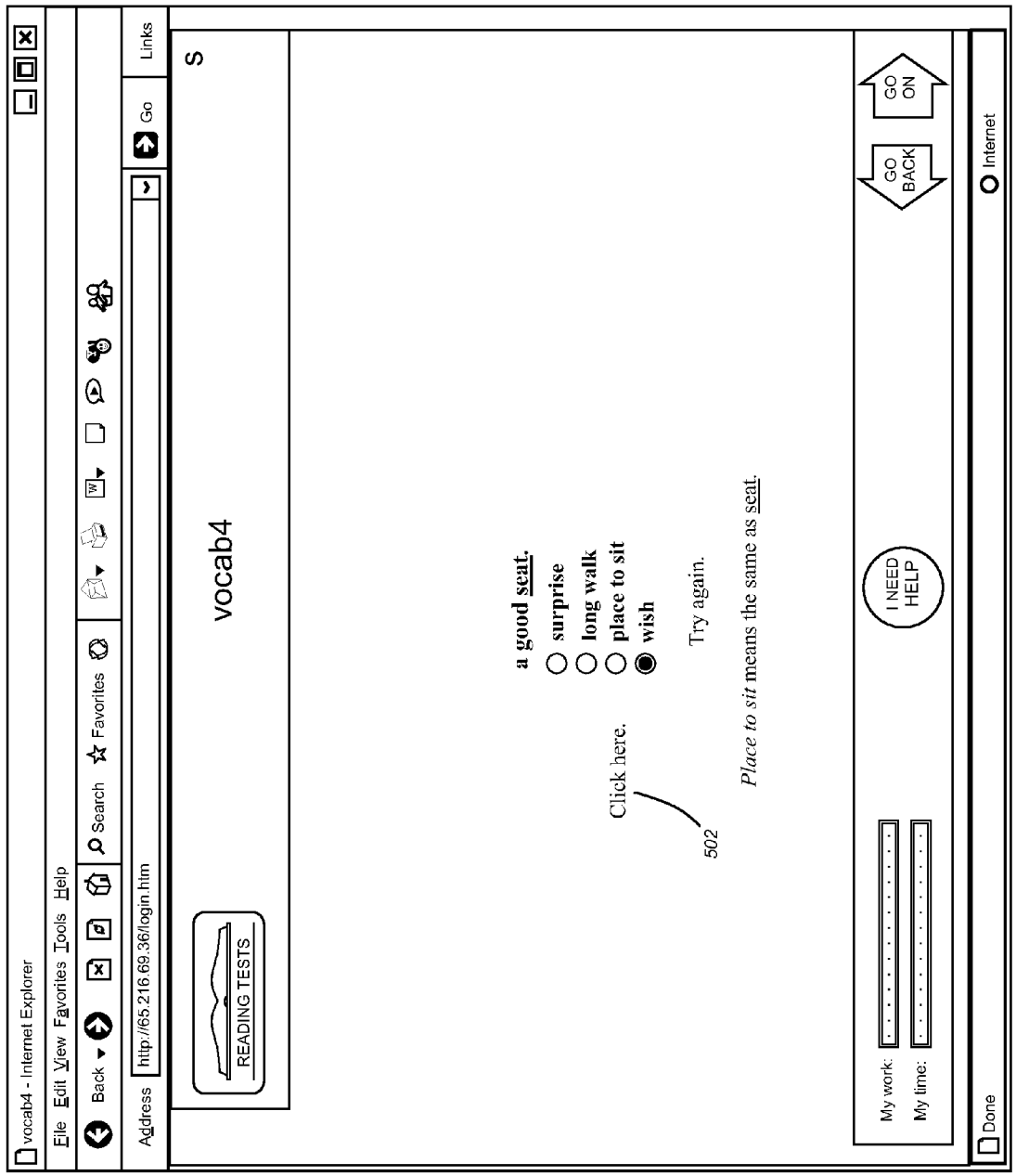
FIG. 5—depicts a practice screen with a wrong answer and a hint to the right answer.

The online test platform 100 may provide the user an opportunity to train using the online test platform 100 so that the user may become familiar with the interactions necessary to complete each question. User training may be provided through practice screens displayed to the user through the user's web browser. The practice screen as shown in FIGS. 4 and 5 may include a question and a list of possible answers, each answer including a button that may be selected with a pointing device of the web browser such as a computer mouse. The GO-ON 302 button may be disabled during a practice screen until the user has selected the correct answer.

Figure 6:
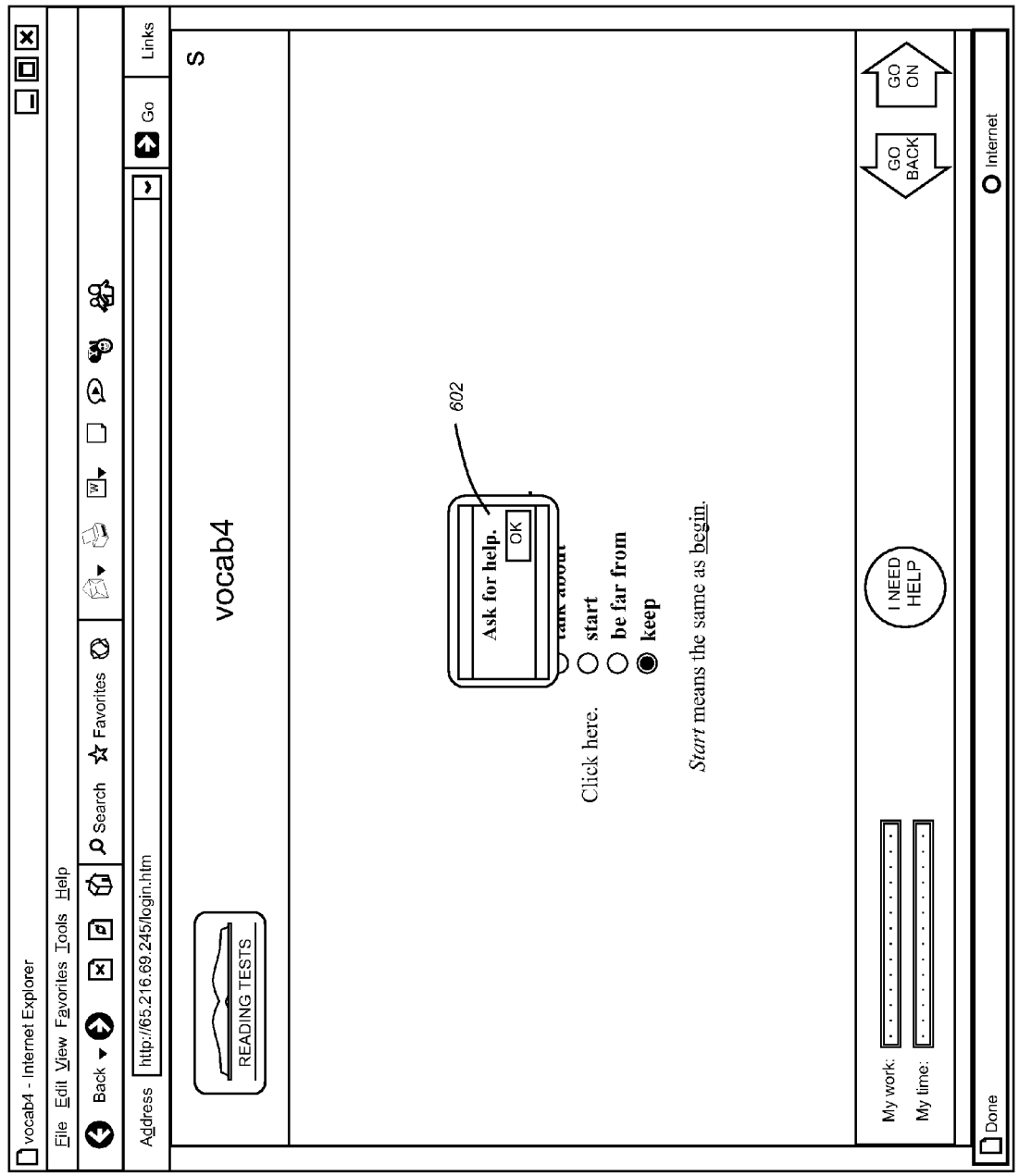
FIG. 6—depicts a practice screen with a wrong answer after the right answer has been indicated.
Figure 7:
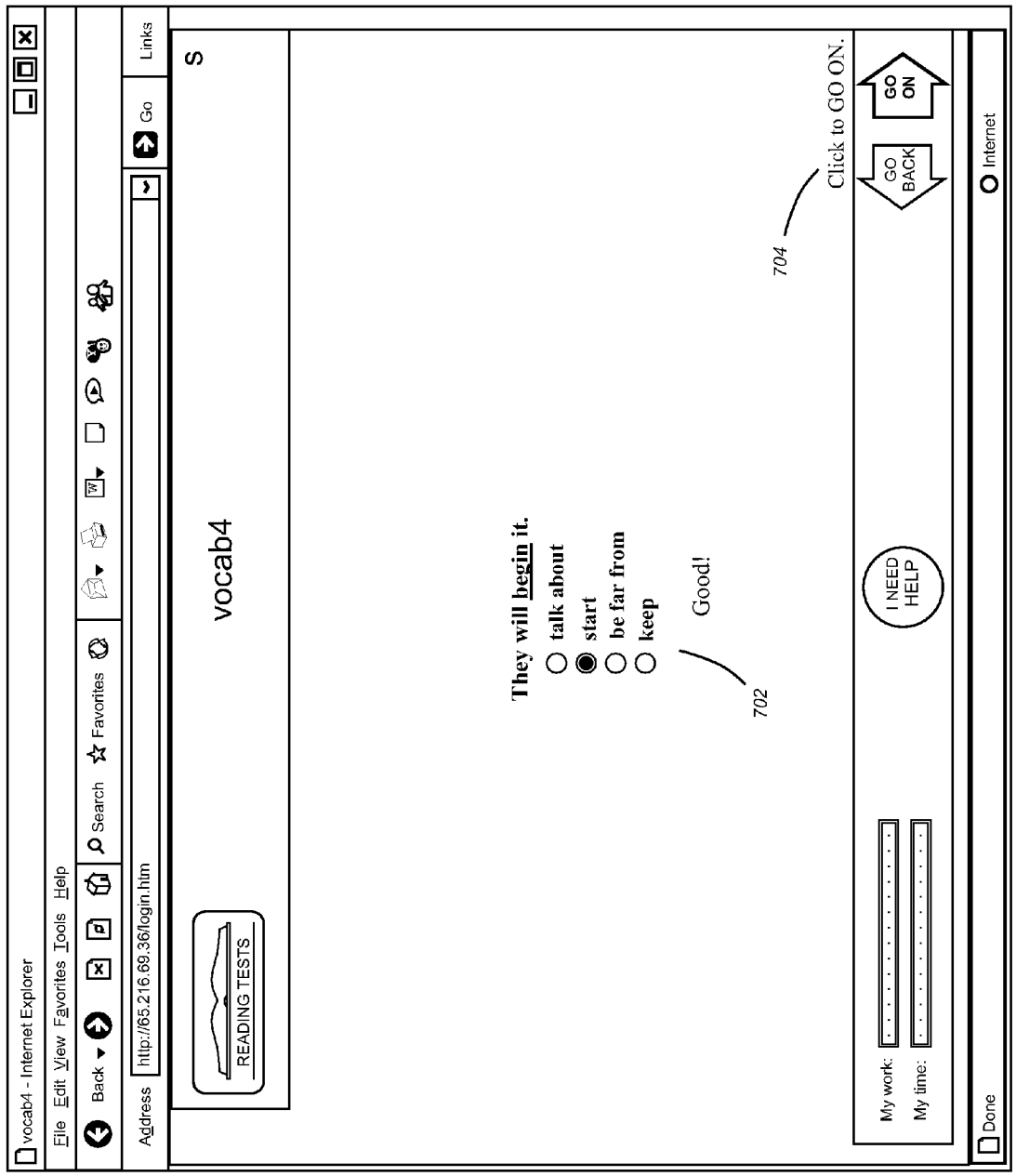
FIG. 7—depicts a practice screen with the right answer and feedback.

Practice screens may provide information about the use of the online test platform 100 simultaneously with presenting questions to be answered by the user. The information may be dynamically displayed based at least in part on a user input. The information may also be based at least in part on an aspect of the status of the user's interaction with a practice screen, such as the number of incorrect tries a user has made to answer the current question. As shown in FIG. 4, a practice screen may provide clues to the user, based at least in part on a selection of an answer by the user. In FIG. 4, the user has selected an incorrect answer, and the online test platform 100 has displayed a clue 402 indicating that the answer is wrong. In FIG. 5, the user has selected another wrong answer, and the online test platform 100 has presented a clue 402 indicating the right answer. As shown in the sequence of FIGS. 4 and 5, the online test platform 100 provides stronger feedback for each of the first two wrong answers selected by the user on a practice screen. If the user selects another wrong answer after the online test platform 100 has indicated the right answer, an "assistance needed" indication 602 to the user to seek HELP 304 may be presented as shown in FIG. 6. While displaying a practice screen, the online test platform 100 may, as shown in FIG. 7, display a positive acknowledgement 702 for selecting a right answer, and a progress message 704 may direct the user to click the GO-ON 302 button. The GO-BACK 308 icon may be disabled throughout the practice screens. Student responses to training and/or practice screens may be analyzed, such as in association with a performance rule, to determine the level of the student's preparedness to take the test.

Training or practice screens may include questions, features, and accommodations based on aspects of a user, such as may be represented by information in a user profile associated with the platform 100. The training and/or practice screens may be dynamically generated for each user based on the user profile, which may include a user history, demographics, educational assessments, special education plans, laws, preferences, and the like. In an example, a dynamic animation compilation facility associated with the platform may adapt the presentation of training and/or practice screens by adjusting the number of questions, the number of opportunities to select a correct answer, time associated with the training and/or practice screens, and the like.

An on-line test may involve testing a large number of students during the same test session. The students taking the test together may have demonstrated very different levels of academic progress. Therefore an academically gifted or advanced student may benefit from questions with greater difficulty or complexity, while an academically below average student may not benefit from the same questions. To accommodate both normal diversity of academic skill and special needs diversity, the test questions presented to the user may be based on the user responses to the training and/or practice screens. The platform 100 may be associated with an adaptive testing module that may determine, for each user instance of testing, an individual test question starting point. Practice or training question responses could be used to set a level at which the adaptive test would be generated for the individual user instance. In an example, a user who has previously demonstrated high academic skill, and has successfully completed the adapted training and/or practice screens, may be presented with a set of advanced questions from the online test session. In the example, a student with average academic skill may be presented the standard test questions. Further in the example, a student who has significant trouble with the training and/or practice screens may be offered accommodations such as an on-line dictionary, or the like to facilitate taking the test. An online test may be compiled on-demand for each student and may include only the questions, accommodations, and other adjustments determined for that student.

Each student may be associated with a profile that may include testing metadata related to the student. The metadata may be used by the platform 100 to set accommodations, and support updating content in the test taker's web browser based on the testing metadata. Testing metadata may include user testing history such as testing results, prior testing performance, testing achievement levels, and the like. The testing metadata may be delivered along with test results for scoring the test so that information such as test information, student information, scoring rules, and the like may be associated with the testing session and the scoring of the test.

Figure 8:
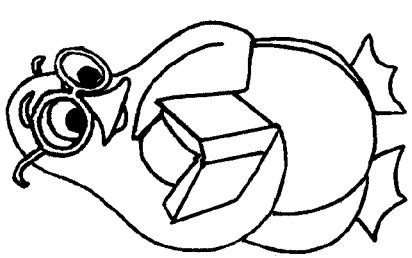
FIG. 8—depicts a test introductory screen.

The test screens of the online test platform 100 may first be presented to the user once the user has completed the practice screens and selects GO-ON 302. The online test platform 100 may provide a single introductory screen prior to displaying the test screens. This introductory screen provides relevant instruction, information, and/or guidance for completing the test screens. FIG. 8 depicts the introductory screen. The introductory screen indicates the number of questions to answer 802, the number of minutes 804, and progress indicators 808 for time used and questions completed. Note that the progress indicators 808 are present and active for all subsequent test screens.

Figure 9:
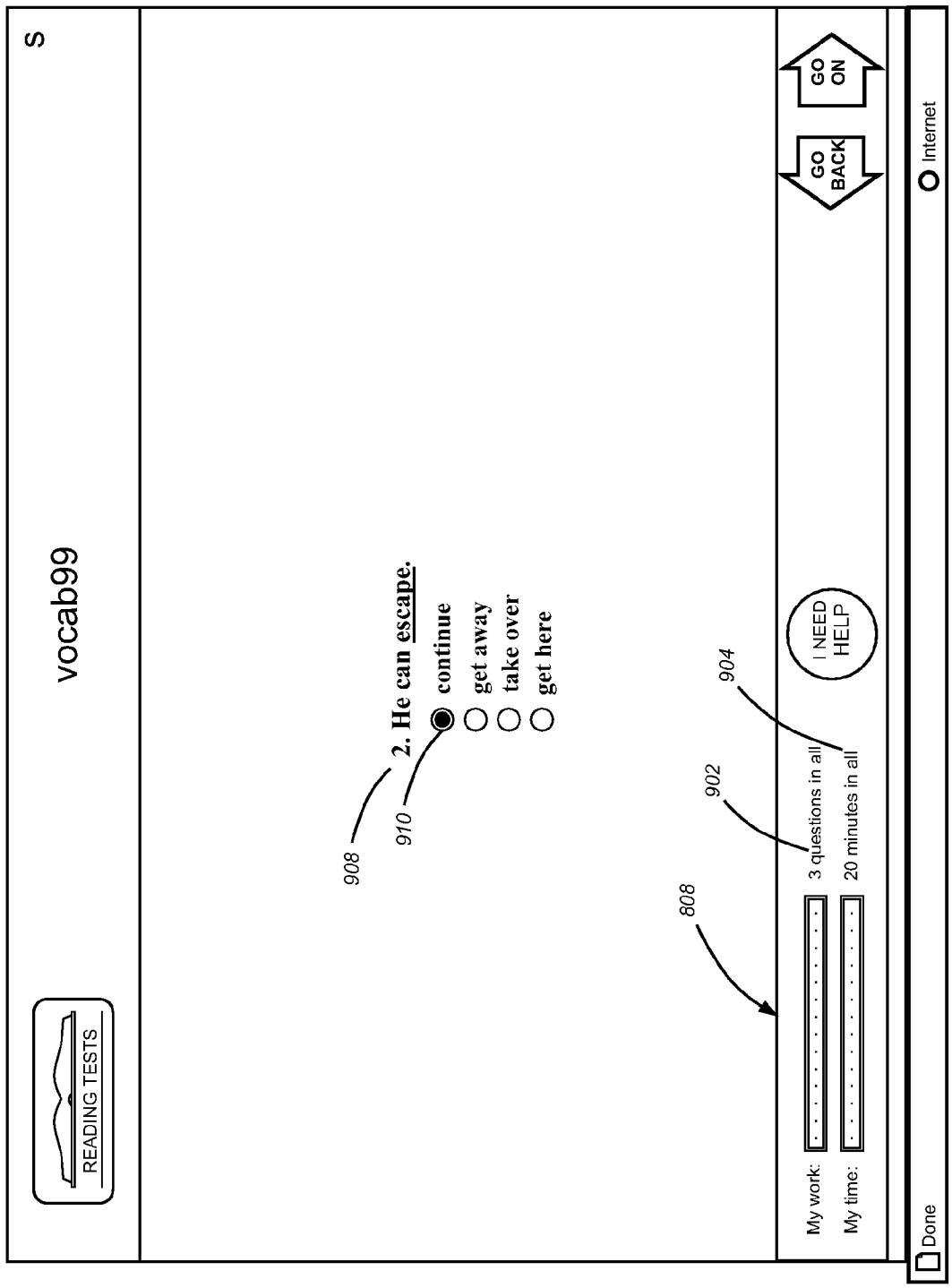
FIG. 9—depicts a vocabulary test screen with question and time progress indicators.

The online test platform 100 may also include test screens that may display a list of answers similarly to a practice screen. One such test screen for a vocabulary test is depicted in FIG. 9 with the list of answers shown as item 908. However, the test screen may not include the hints and detailed instructions for completing each question that were presented in the practice screens.

A user may select an answer from a list of possible answers on a test screen, or the user may decide to provide no answer before displaying the next test screen by selecting the GO-ON 302 button. In this way a user may not be forced to answer a question before proceeding to another question. A user may also select a GO-BACK 308 button, when it is activated by the online test platform 100, to display the test screen presented immediately prior to the current test screen. This may be useful for reviewing a question just answered or selecting an answer for a question just skipped.

Responses to test questions may include text responses, such as a response typed into an open text field presented to the user. The typed response may be a language response, a numeric response, or a combination thereof. Responses may also be audio based responses such as a pronunciation of a word, normal speech, foreign language recitation, and the like. Responses to test questions may also be video based. A test of sign language may require a video response. A test of airport tarmac traffic direction knowledge may require a video response.

Test questions may include text, video, audio, images, any combination thereof, and the like. Test question responses may include selecting among a plurality of responses that include text, video, audio, images, any combination thereof, and the like Referring again to FIG. 9, a user may de-select an answer previously selected by selecting the answer button 910 associated with the previously selected answer.

The test screen may display a status indicator such as a completion status bar that provides indication of relative progress toward completion of the test questions. At least a portion of the indicator may change to a different color based on a ratio of the number of answers provided to the total number to be presented in the session. The test screen may also provide a time indicator, representing a ratio of time used in the session to a total time allowed to complete the session. In an example, FIG. 9 shows a question progress bar indicating that approximately a very small number of the questions to be presented have been completed. FIG. 9 also shows a time indicator bar indicating the amount of time used of the total of 30 minutes allowed to complete the session. Other indication forms such as a pie chart, a count, a clock, a digital timer, and the like may alternatively represent the test completion status and the time used status. The test question and time used indicators may be useful to a user in allocating test time to questions. It may also be useful to indicate to users how many more questions they have to answer, including questions they may have chosen to initially skip. The progress indicators 808 may include a total count of questions 902 and a total time allowed 904. These may facilitate a user assessing how many of the total questions 902 have been answered by comparing the amount of the progress bar 808 consumed to the total number of questions. The time progress bar 808 may facilitate similar user assessment of the time of the test.

Figure 9A:
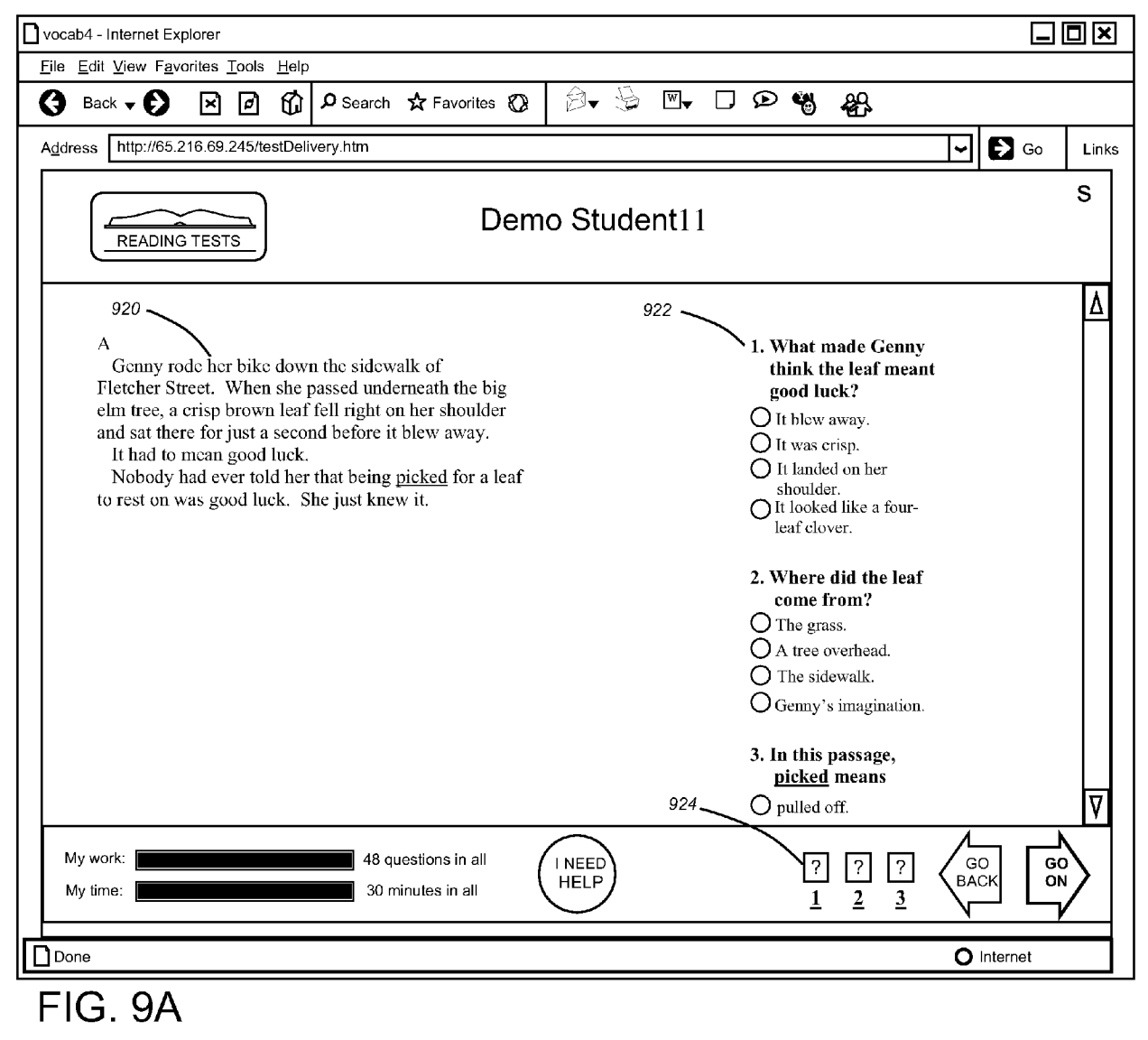

Comprehension test screens that include both a reading passage 920 and a list of questions 922, as shown in FIG. 9A, may include an auto-scroll feature that facilitates a user scrolling the list of questions 922 while keeping the reading passage prompt visible on the screen. A comprehension test screen may also include a question status menu 924 to facilitate viewing the current answer status of each question associated with the screen and for rapidly accessing the questions. The question numbers displayed in the question status menu 924 increment with each subsequent comprehension test screen displayed so that the user can easily determine how many questions are left to answer. The list of questions 922 may automatically scroll so that the entire question and each possible answer are scrolled into the visible portion of the user web browser window when the user selects a test question number in the question status menu 924 or the test question in the list 922. By providing automatic scrolling, the user does not have to spend time learning how to use the scroll mechanism to find a particular question, thereby saving valuable time to read or re-read a passage and answer the question. The auto-scroll feature may be activated any time there are more questions than can be displayed at one time. This situation may occur more often for a comprehension test question than a vocabulary question because the comprehension test may include a plurality of questions about the passage.

The user may use the GO-ON 302 and GO-BACK 308 buttons to view each test screen, answering or skipping any questions on each screen. When the user selects GO-ON 302 on the last test screen in the sequence, a confirmation summary screen as shown in FIG. 10 may appear through which a user may confirm the status of each question and review the answers provided to each question. The summary page may include an instruction 1002 to the user so that the user can effectively use the summary page. The summary page may further include a list of the questions the user has viewed in the test sequence. Those questions that the user has not answered may include an associated status icon 1004. The user may select either a question number 1008 or the status icon 1004 to automatically view the test screen associated with the question number 1008. Once the user has selected and reviewed any questions on the summary page, the user can select the I'M DONE icon 1010. Note that the I'M DONE icon 1010 replaces the GO-ON 302 and GO-BACK 308 icons displayed on the test pages. The I'M-DONE icon 1010 may indicate to the server 104 that the user has completed any desired review of the questions.

Figure 10A:
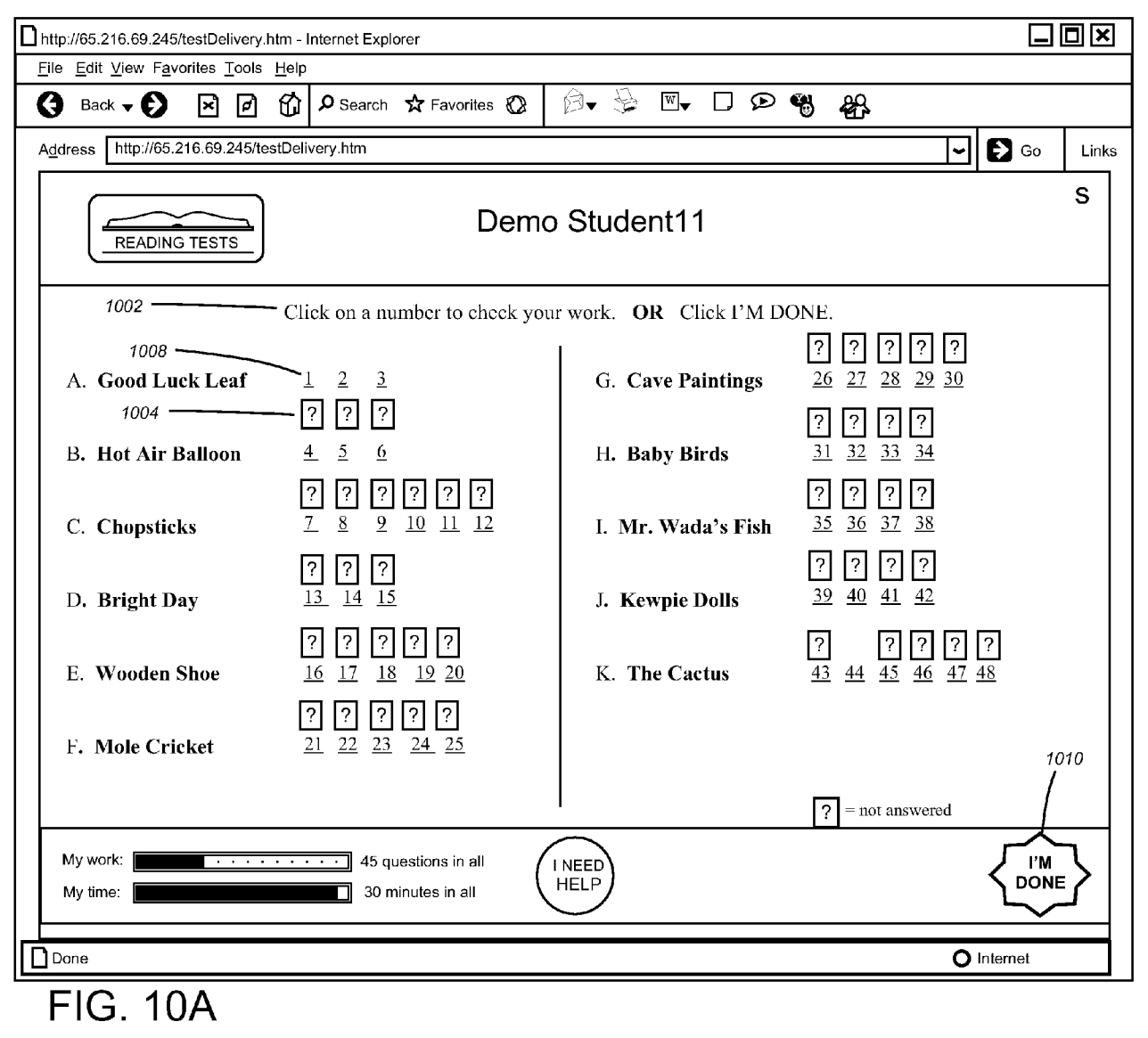

FIG. 10A depicts a summary screen for a comprehension test session.

Figure 11:
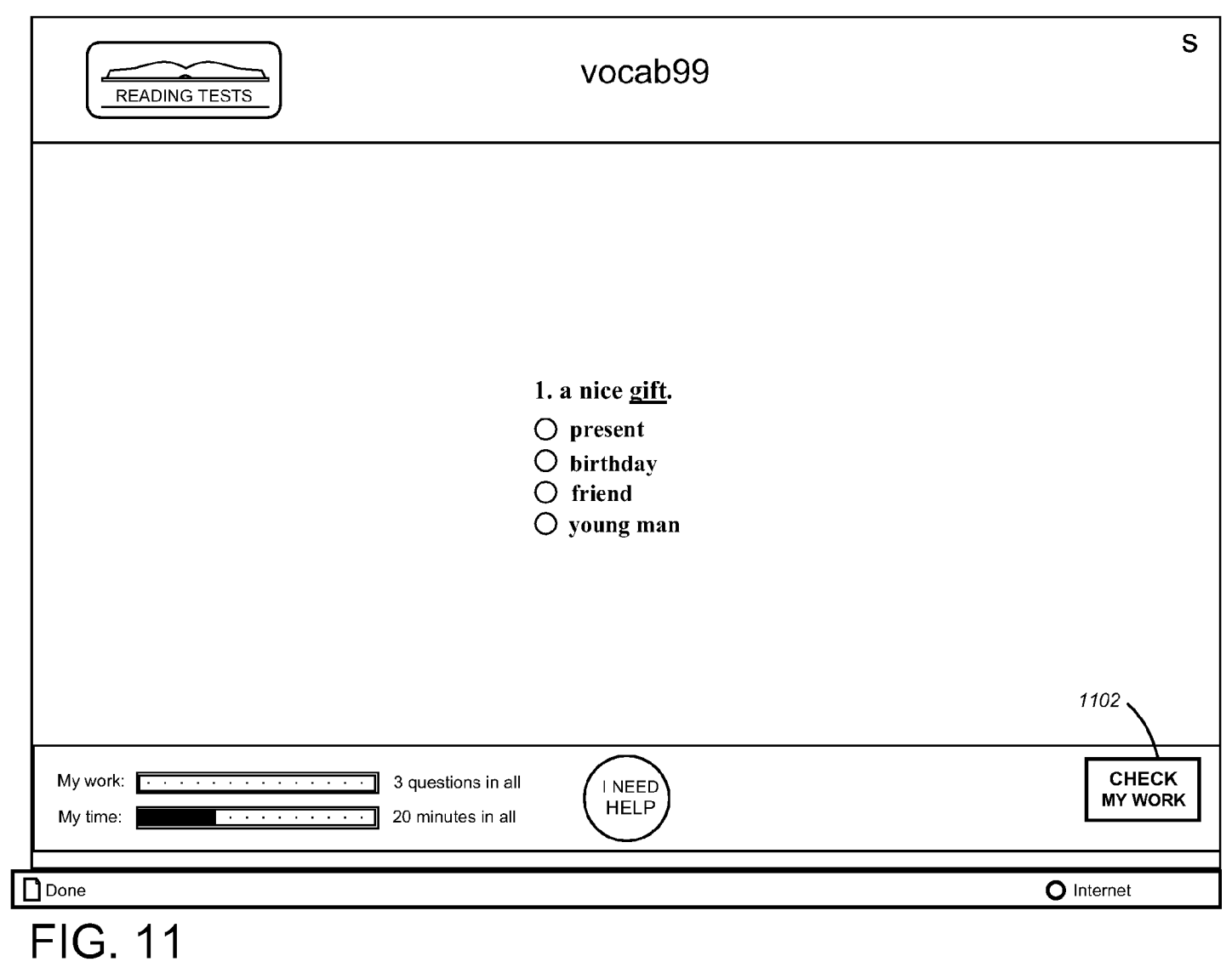

The user may select one of the items as described herein that may be associated with a question in the confirmation list to display the test page associated with the question. The review test page shown in FIG. 11 allows a user to de-select an answer, select another answer, select an answer if one was not already selected, or make no changes. The user may then select the CHECK-MY-WORK icon 1102 to return to the confirmation screen. Note that the CHECK-MY-WORK icon 1102 replaces the GO-ON 302 and GO-BACK 308 icons shown on the test screen when the user initially viewed the test screens.

Figure 12:
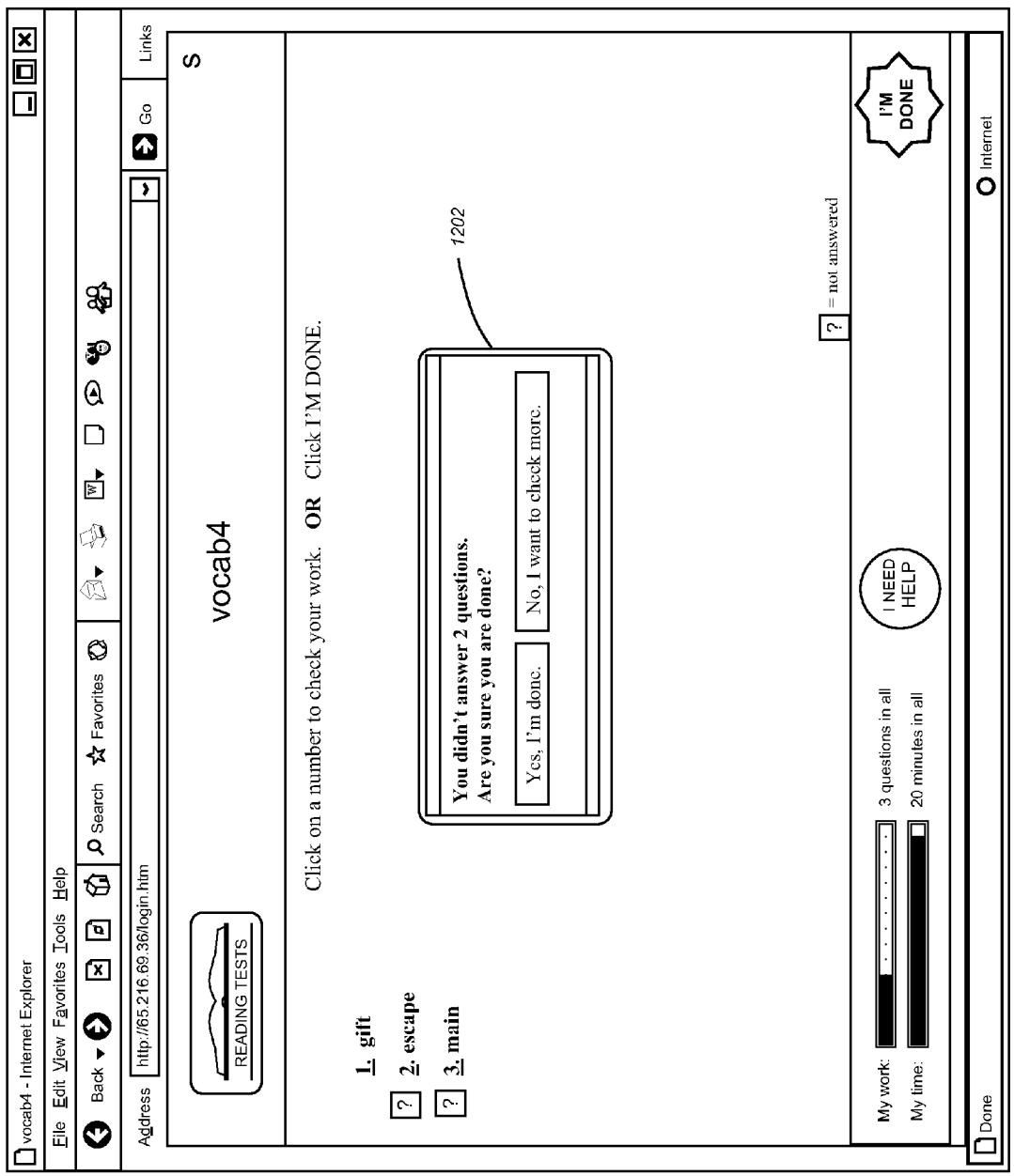
FIG. 12—depicts a confirmation screen with unanswered question alert.

As a result of the user selecting the I'M DONE icon 1010, the server 104 may determine that the user has not completed all of the questions and may direct the web browser to (or the web browser may determine it and) display an alert 1202 as shown in FIG. 12 indicating the number of unanswered questions. The alert may include a choice to complete the test with unanswered questions or to return to the confirmation screen.

Figure 13:
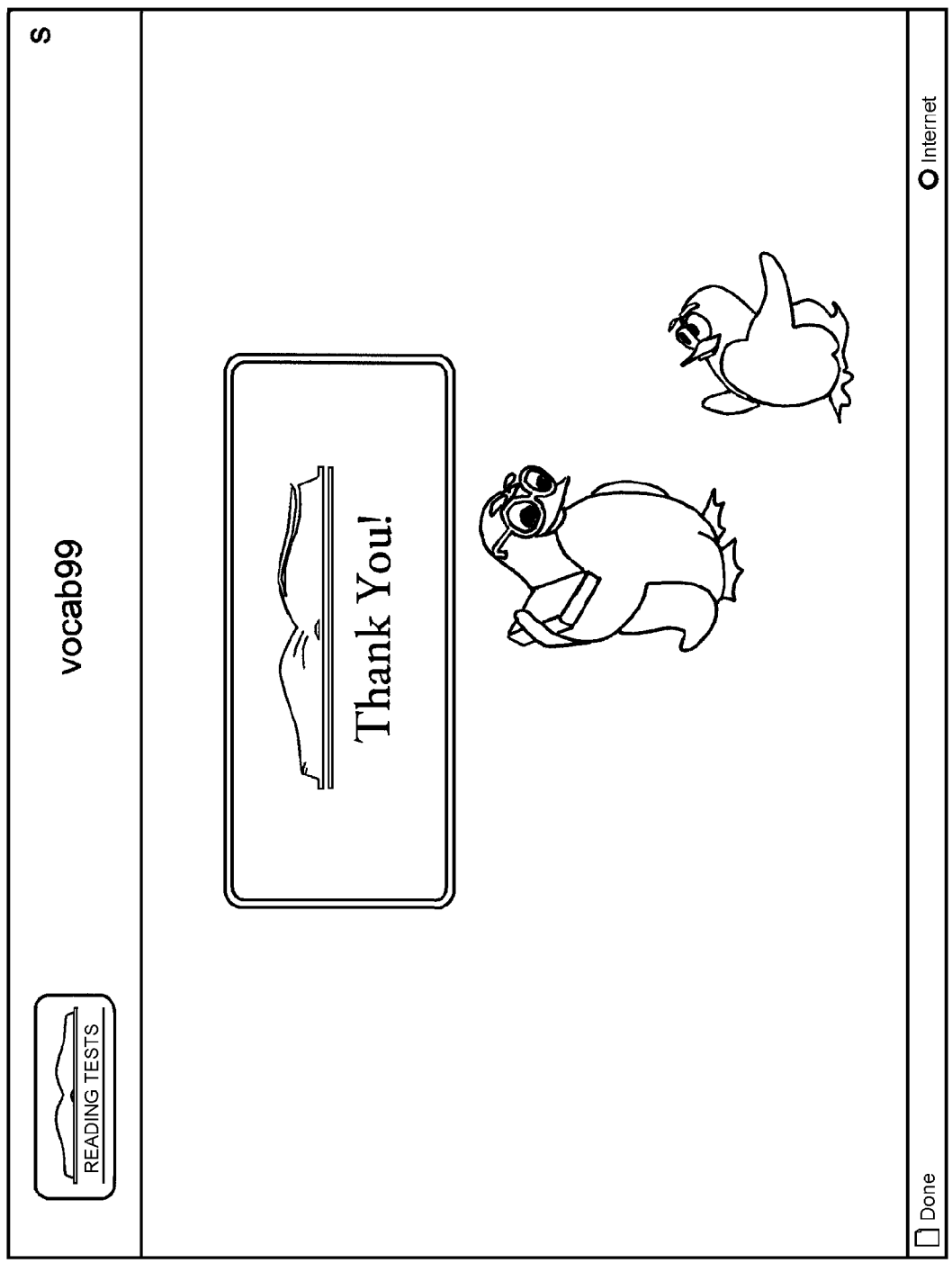
FIG. 13—depicts a thank you screen.

Once a user has completed viewing all questions, has indicated to the online test platform 100 he or she is done, and has confirmed that all unanswered questions are acceptable, the online test platform 100 may close the user testing session and display a credit screen as shown in FIG. 13 before returning to the user login screen of FIG. 2. If the test may have an AUTO PROGRESS flag set to true, the student may be able to take the next subtest in the assessment sequence.

The online testing platform 100 may be associated with a Service Oriented Architecture (SOA). The platform may include service oriented architecture as a point-to-point service connection such as may be represented by one provider and one consumer. One of the services (e.g. a test proctoring service) may be registered with another service of the SOA (e.g. a test administration/content service) using a remote method indication, such as Java's RMI.

An SOA registry may be used with the platform so that enterprise service businesses may be dynamically discovered by third parties or external vendors. The SOA services associated with the platform 100 may be encapsulated as Java-compliant services (modules). Java RMI and web services 2.0 could be combined with UDDI to facilitate third parties discovering the Java-compliant services (modules) of the platform 100. The services could be exposed for public consumption or maintained behind a firewall and exposed for private, password protected consumption.

In an example of a SOA with externally discoverable services, test presentation accommodations may be provided by a third party. A third party could retrieve test assembly data and provide feedback that supports the accommodations (e.g. larger fonts, different audio, and the like) making the underlying test data standalone from the user interface. In another example, the online test assembly data could be extracted so that it could interact with third party accessibility software.

The platform 100 may also support an event-driven SOA environment such as may be facilitated by rich internet applications. An event-driven interaction may be integrated with the station 102 to server 104 communication so that, as an example, answering a question on the station 102 triggers an event on the server 104 to perform an update of information related to the testing session, rather than waiting for a web form submission. Event-driven platform functionality may be associated with polling to provide enhanced communication between a station 102 and a server 104.

Figure 14:
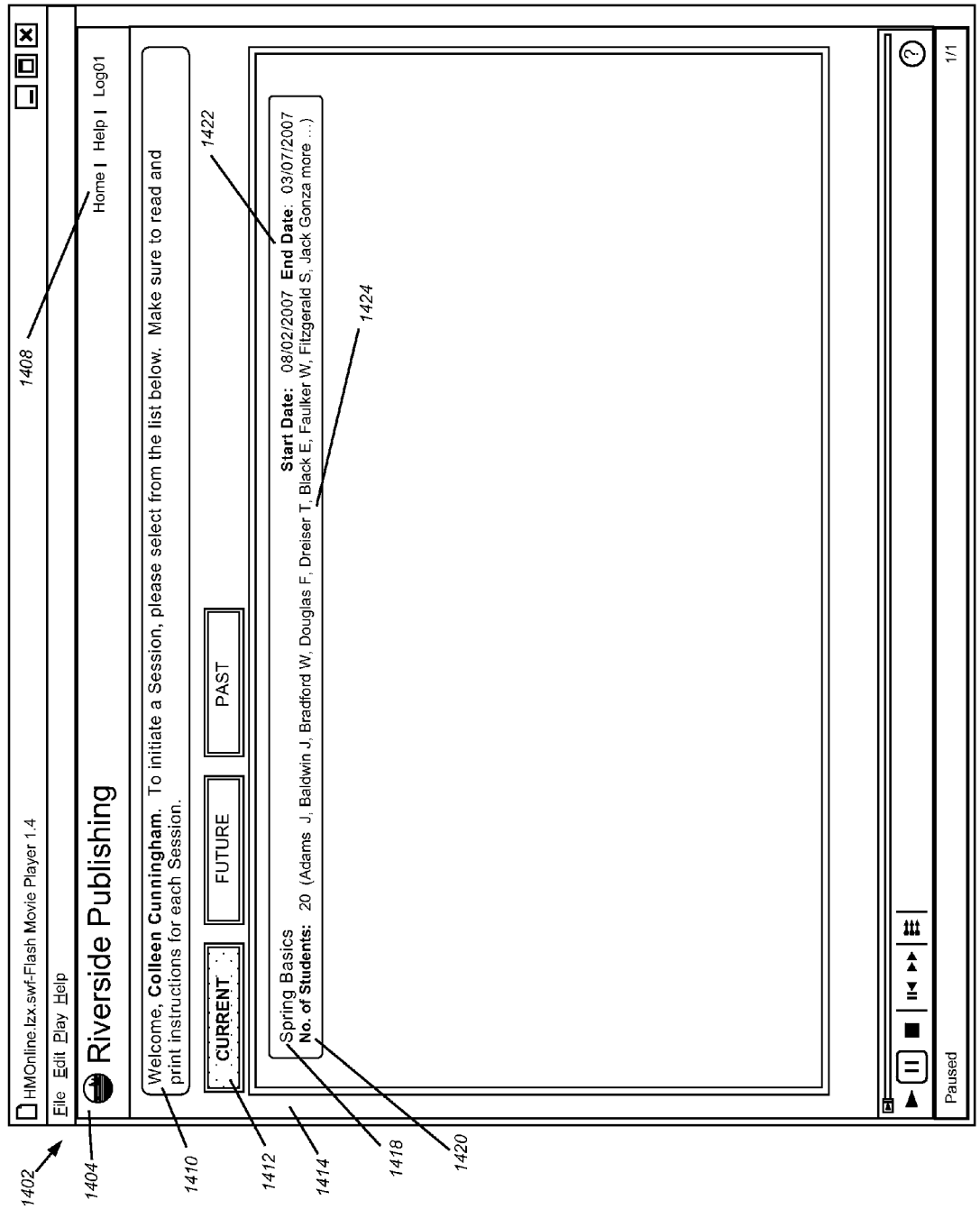
FIG. 14—depicts a welcome screen of the proctoring interface.

Referring to FIG. 14, an online test platform 100 may include a proctoring interface. The proctoring interface may include various display screens for facilitating a user, or proctor interfacing, with the online test platform 100. A welcome screen 1402 may include selections and controls that facilitate managing proctor activities associated with test selection and operation. The welcome screen 1402 may include a proctoring header 1404 that may display a logo or name of a facilitator of the proctoring platform 100, and a top level menu 1408. The welcome screen 1402 may further include a welcome message 1410, a test time frame selection 1412, and a test display area 1414. The test display area 1414 may include one or more test selections 1418. The test selections 1418 may further include student names 1420, test time frame 1422, and an expansion selector 1424.

The proctoring header 1404 may be similar to a header associated with other aspects of an online test platform 100 to provide branding, marketing, or other purposes such as trade marking, and the like. The proctoring header 1404 may identify one or more business entities associated with the online test platform 100. The proctoring header 1404 may also include a top menu 1408 that may provide access to top level menu functions such as Home, Help, and Log On/Off. The top menu 1408 may be consistent across some or all of the screens of the proctoring interface to provide consistent and convenient access to these menu selections independent of the details of the remainder of a displayed screen. The Home menu selection may provide a proctor access to a beginning or general display screen. Selecting the Home menu may display the welcome screen 1402, or another screen of the online test platform 100. The Help menu selection may provide access to menus that allow a proctor to get general help, context specific help, or some combination of general and context specific help. The menu choices presented when a proctor selects the Help menu item may be based at least in part on aspects of the currently displayed screen, so that the proctor can receive predetermined help related to an activity the proctor is currently performing. The Help menu may also provide access to other forms of help such as querying a database of frequently asked questions, requesting help from an administrator, creating custom help menus, submitting a help request, and the like. The Log On/Off menu selection may provide security features related to accessing aspects of the online test platform 100 such as the proctoring interface. All Log On/Off aspects, functions, features, methods, and systems herein described may be appropriately applied to the Log On/Off menu selection of the proctor header 1404 top menu 1408.

In embodiments, the proctoring interface may enable a user to view, organizing, arrange, display, distribute, print or perform some other management activity with the login and password information associated with test takers. For example, a proctor may be able to display the login username and passwords for all persons scheduled to take a test and print out this information for distribution to each test taker to inform him of the correct login procedure for a test.

In embodiments, a student that is logging into a proctored test may first be directed to a page that is intended as a holding area or virtual waiting room for the test taker until the proctor indicates that the test may begin. The proctor may be signaled that the user has logged in and is waiting in the virtual waiting room for the test to begin. This waiting page may include features to occupy test takers while waiting for the proctor to begin an exam. For example, the waiting page may provide a drawing capability in which a test taker may be able to use a mouse cursor to draw lines, shapes, colors, letters, and the like on a section of the waiting page devoted to this capability. In another example, the waiting page may provide any number of games or other activities that are designed to break the monotony of the wait, such as word puzzles, sudoku, interactive video game, or some other activity that may be presented to a test taker on the waiting page. In embodiments, the waiting page may include an indication of the anticipated amount of time before a test is to begin. This indication may be a clock that is counting down the minutes and seconds until the start time. In another example, the indication may be a listing of the percentage of the total number of test takers that are logged on and ready to begin the exam.

The proctoring interface welcome screen 1402 may further include a welcome message 1410. The welcome message 1410 may display temporarily to facilitate providing critical or other welcoming information to a proctor. The welcome message 1410 may alternatively remain visible each time the welcome screen 1402 is displayed. The welcome message 1410 may further provide different information, annotations, graphics, colors, animation, shape, and the like each time the welcome screen 1402 is displayed. These changes may occur only when the welcome screen 1402 is revisited, or may occur after a period of time while the welcome screen 1402 is displayed, or based on a selection of another of the controls available to the proctor on the welcome screen 1402. The changes in appearance of the welcome message 1410 may be beneficial and functional in that they may provide a visual indication to the proctor that the proctor has just logged onto the test platform 100 or is displaying the welcome screen 1402 for the first time since logging onto the test platform 100. The welcome message 1410 may further provide important feedback to the proctor that helps the proctor ensure the test platform 100 has properly recognized him/her during the logon process. In an example, as shown in FIG. 14, the proctor's name may be displayed in the welcome message 1410. A proctor can readily determine that an error associated with log on may have occurred if the name displayed is not the proctor's name.

The welcome message 1410 may, in addition to displaying the proctor's name, may provide important information that is timely, critical for the proctor to read, or otherwise deemed necessary for the proctor to use the proctoring interface. In such a configuration, the welcome message 1410 may further include a confirmation selection that the proctor may have to select with the computer input device to provide positive feedback to the platform 100 that the proctor has viewed and/or read the welcome message 1410.

Information displayed in the welcome screen 1402 may be limited based on access rights and or security aspects of the proctor whose name is displayed in the welcome message 1410. Examples of how the proctor log on may impact information displayed on screens of the proctor user interface will be presented with relevant disclosure herein.

The proctor welcome screen 1402 may also include a test time frame selection 1412. A test time frame may include fixed time frames such as may be determined by a calendar or a school year, and the like. A test time frame may include variable time frames, and/or a combination of variable and fixed. Variable time frames may include relative time frames as shown in FIG. 14 that may be based at least in part on the current date. In FIG. 14, the time frame selection includes Past, Current, and Future time frames. As may be anticipated, the Past and Future selections provide access to tests that have already occurred (Past) or have not yet started (Future). In an example, selecting Past may display, in the test display area 1414, completed tests that the proctor has proctored before today or tests that have been taken in the past but have not yet been finalized. Because the test time frame may include resolution finer than one day, the Past selection may display any completed test that was proctored by the current proctor before the current time. Selecting the Future time frame may display one or more tests that the proctor may proctor in the future. Tests displayed when the Future time frame is selected may be conditional in that they may be scheduled but may or may not occur based on a contingency. Displayed future tests may be scheduled and may occur but may be proctored by another proctor.

Selecting time frame selection 1412 Current, as shown in FIG. 14, may display one or more tests in the test display area 1414 that the proctor is currently responsible for proctoring. The current time frame may include any time period that includes the current date, day, and/or time. In an example, a test that started yesterday and ends tomorrow may be included in the current time frame. In another example, a test that started 10 minutes ago and ends in 2 hours may be included in the current time frame. An example of a test that may not be displayed in the current time frame is a test that started yesterday and finished 2 hours ago. Alternatively, the current time frame may include any test that has unfinished proctoring activity associated with it. In an example of this alternate embodiment of the current time frame, if a proctor has not completed all activities for a test that ended earlier today, such as recording observations about the test, the test may be displayed in the current time frame rather than in the past time frame. Time frames disclosed herein are only simple examples and are not meant to be limiting. Any and all time frames, including time frames that have dependency on other events, tests, proctors, and the like may be included and may be represented by the time frame selector 1412.

The welcome screen 1402 of the proctoring interface of the online testing platform 100 may include a test area 1414. The area may be displayed as shown in FIG. 14. As indicated herein, one or more tests 1418 associated with the time frame indicated by time frame selector 1412 may be displayed in the test area 1414. Tests 1418 displayed in the test area 1414 may be associated with the currently logged in proctor. Each test 1418 may include a descriptive title, such as "Spring Basics" as shown in FIG. 14. A test 1418 may further include a start and end date 1422, and student names 1420, and an expansion selector 1424. Start and end dates 1422 may be displayed as shown in FIG. 14 and may include a month, date, and year. Alternatively, the start and end may be displayed relative to the current date and may include "yesterday", "tomorrow", and the like. Start and end dates may be displayed as names of days of the week. Independently of how the start and end dates are displayed, they may represent the earliest date a student may begin the test (Start date) and the latest a student may finish the test (End date). They may also indicate to the proctor the test window of time that the proctor is responsible for proctoring the test. The start and end dates may, or may not, indicate further limits on starting and ending the test. In an example, the proctor may end the test earlier than the end date if all students listed in student names 1420 have completed the test prior to the proctor ending the test. Additionally, a student may be further limited with respect to ending a test based on when the student starts the test. Therefore, the start and end dates may indicate a window of time in which the test is available to be started by a student, and must be completed by a student. Start and end dates may also be adjustable by a proctor to accommodate students for unavoidable circumstances such as storms, illness, and the like.

The list of student names 1420 may be displayed as shown in FIG. 14 wherein the count of students associated with the test, and the names of the students are displayed. The number of students associated with the test may indicate the number of students who have registered for the test, the number qualified to take the test, the number requesting to take the test, the number remaining to complete the test, and the like. The names of the students listed 1420 may be ordered, such as alphabetically first letter of last name, or by some other order. To provide privacy to the students, the names may be pseudonyms created by the online test platform 100 and linked to the actual student records. Based at least in part on the size of the screen 1402 and the size of a window containing the screen 1402, some of the student names may not be displayed in the list of student names 1420. In such a configuration, the name may be ended as shown with an indication that more names than can be displayed are associated with the test. The names of students associated with the test that are not displayed, may be displayed by the proctor selecting the "more" text. Alternatively, the list of names may automatically scroll when the proctor places the computer mouse pointer in the general area near the right hand end of the displayed list. The names not displayed may be displayed when the expansion selection 1424 is selected by the proctor. The expanded test display is described below and presented in FIG. 15. Alternatively, the names not displayed may only be visible on another screen of the proctoring interface. The listing of test takers' names may be presented in association with the test takers' login ID and password. The listing of student information may indicate which students are currently logged into the platform. This indication may be made by listing a student as "waiting," having a check or some other mark next to their name, or using some other indication of login status. The listing of student information may be presented in a pop-up window. The pop-up window may be associated with a printing functionality. The printing functionality may permit a proctor to print the entire list of student information, select a subset of students, select an individual student, and the like. The selection may be made by the proctor by clicking a box next to the name of each student for whom a print out is wanted. The print functionality may also include macro print command buttons that enable a proctor to print only one test taker's information per page, to print all test takers on a single page, print some subset of test takers per page, or the like. Printing may be directed to a local printer, a remote printer, a file, or any other relevant medium.

Figure 15:
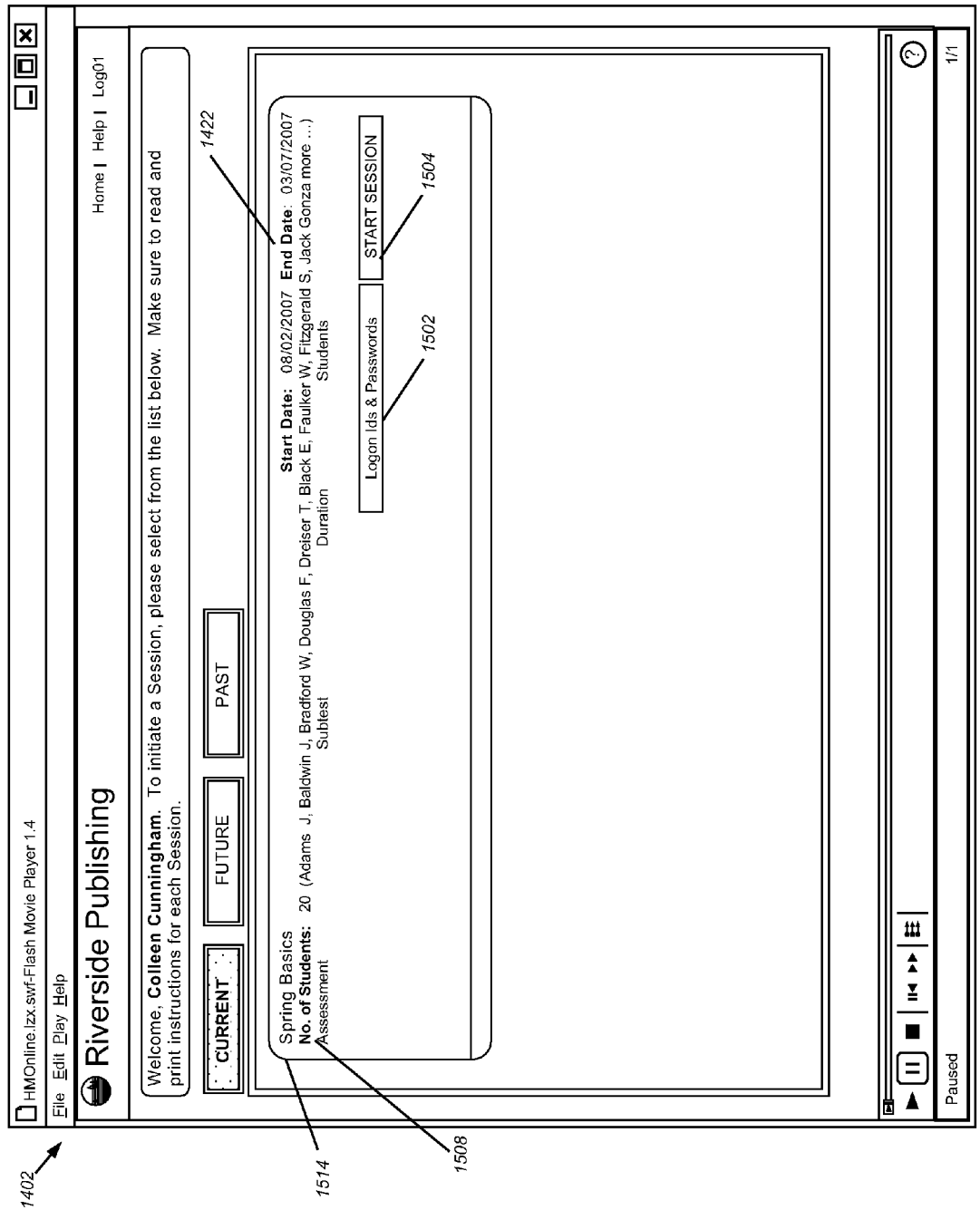
FIG. 15—depicts an open test on the welcome screen of FIG. 14.

Referring to FIG. 15, a depiction of the welcome screen 1402 after the proctor has selected the test expansion selection 1424; the expanded test 1514 provides additional information about the test session associated with student testers and controls related to the students and the test session. In the example of FIG. 15, a proctor may select to view and/or manage Logon IDs & Passwords 1502 of the students associated with the test. The proctor may also select to start the test by selecting Start Session 1504. Expanded information 1508 available to the proctor on the expanded test 1514 may include student assessment, current subtest, student activity duration, and student name. The expanded information 1508 may include other information associated with one or more of the students and the test. In an example, the expanded information 1508 may include duration metrics such as current test average duration, historical average duration, deviation from average for each student, and the like. Aggregate information such as total number of requests for help, and the like may also be available. Information that facilitates proctoring the test or providing feedback to the proctor or other user of the online test platform 100 (e.g., an administrator) may be presented. Starting the test by selecting Start Session 1504 may result in the screen shown in FIG. 16 being displayed to the proctor.

Starting a test using the Start Session 1504 control may be associated with the Start Date 1422. Start Session 1504 may allow a proctor to access test session related information and/or controls but may not allow a student to begin testing if the date on which the proctor selects Start Session 1504 is before start date or after end date 1422. In an example, a proctor may select Start Session 1504 on Mar. 1, 2007, to facilitate preparing to proctor the test session. Alternatively, the Start Session 1504 may be unrelated to the start and end date 1422 as it pertains to students taking the test. In an example, a proctor may select start session 1504 during a time window between the start and end date 1422 of the test so that the proctor can proctor the test. This may facilitate proctors sharing proctoring responsibility for tests by allowing a proctor to assume proctoring responsibility any time it is needed.

Figure 16:
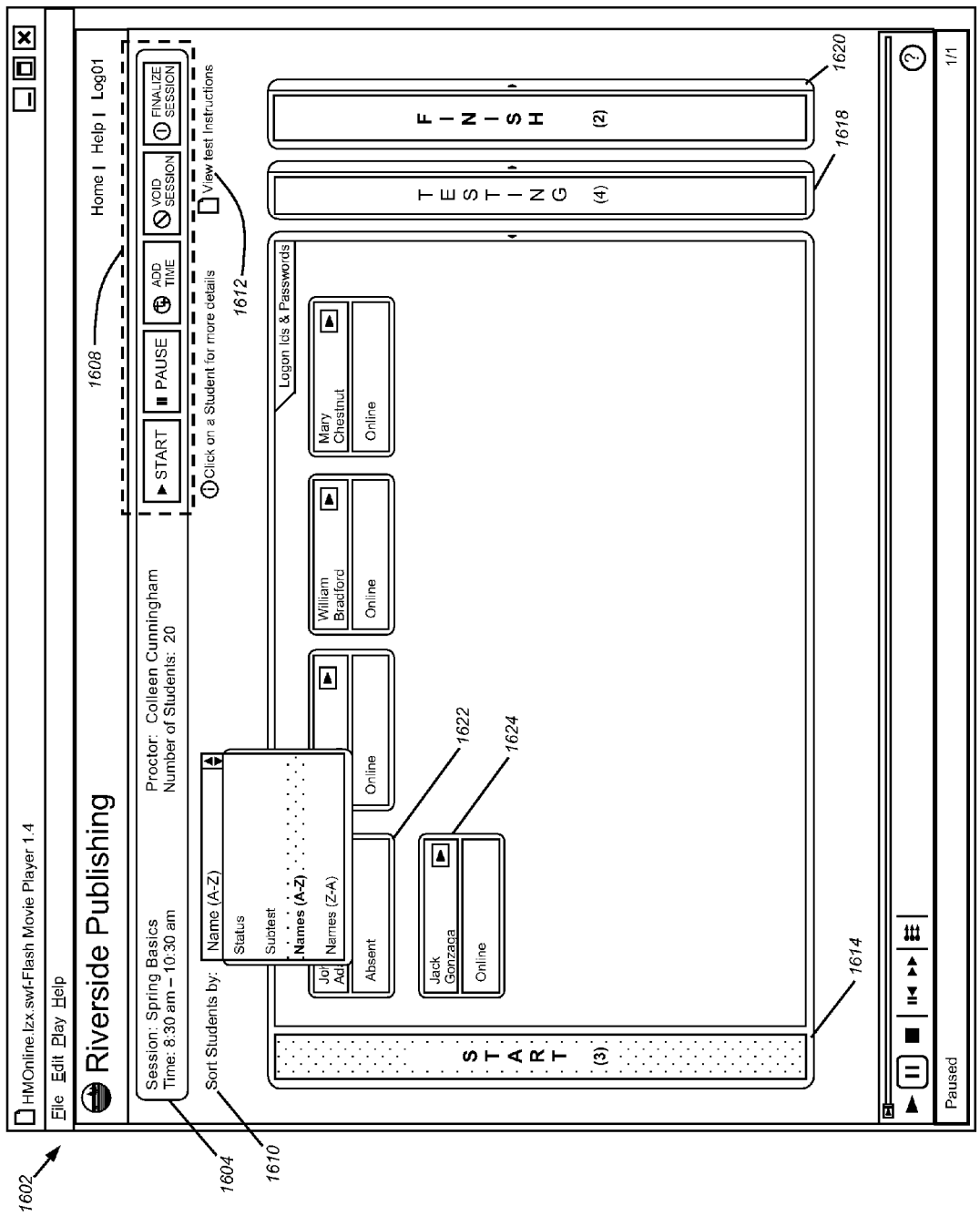
FIG. 16—depicts a proctoring screen of the proctoring interface.

Referring to FIG. 16, a depiction of a test proctoring screen 1602, the proctoring interface may provide controls and status information for proctoring a test started by selecting Start Session 1504 shown in FIG. 15. The test proctoring screen 1602 may include a test header 1604 that may include test controls 1608, a student list control 1610, a view test instructions control 1612, and test status panels, blades, or panes. An open student start panel 1614, a closed student testing panel 1618, and a closed student finish panel 1620. The test status panels may be open or closed. As shown in FIG. 16, one test status panel is open and two are closed. This is exemplary only and not meant to limit the proctoring screen 1602. All test status panels may be closed, and more than one may be open. Such alternatives may be predefined by the online test platform 100 or may be at least partially selectable by the proctor or another user of the platform 100, such as an administrator.

The proctoring screen 1602 may include a test header 1604 that may be displayed and available to the proctor independently of the test status panel display or activity so that the proctor can view critical information about the test such as the session name, session time, proctor, and number of students. Other information about the test session such as the number of absent students, or the time remaining in the session, or the like may alternatively be displayed in the header 1604. The header 1604 may also include general test controls 1608 that may impact all students associated with the current test session. General test controls may allow a proctor to take any action for all students participating in a proctored on-line test session that the proctor could take for any one student. General controls 1608 may include Start, Pause, Add Time, Void Session, and Finalize Session as shown in FIG. 16. Other controls of a general nature may also be included. General controls 1608 may be configurable by the proctor or an administrator of the online test platform 100 and may be based on user preferences. Configurability of the general test controls may be limited so that a consistent presentation and essential general controls are displayed. Such limits and essential controls may be defined in or on configuration tables or files of the online test platform. General controls may alternatively be predefined within the online test platform 100. In an example, selecting general control 1608 Start may change the status of the students shown in the start test status panel 1614 from "start" to "testing" so that the students may appear in the testing status panel 1618 when it is opened. Selecting general control 1608 Void Session may result in the test session of each student to be cancelled and all test results entered discarded. Because voiding a session may be a considerable inconvenience for students testing 1618 or finished 1620, a confirmation of the selection may be displayed before the action to void the test session is executed. The confirmation may be a pop-up window and may include requiring the proctor to enter an authorization code, selecting a reason to void the test session, an acceptance of the selection, or a combination of such confirmations. This information may then be stored as part of the audit trail information for that test session.

In embodiments, the proctoring interface may provide a plurality of organizational controls for organizing the content within the proctoring interface. In an example, test takers may be represented graphically within the proctoring interface as icons, or represented in some other manner, such as a text listing of their names and associated information (e.g., the test that each is taking). The displayed representations of the students may be passive or may be active. Active representations (iconic, image, text, or the like) may facilitate organizing the students, performing proctoring related actions associated with the students, and the like. An active representation, such as an icon, may allow a proctor to change a state of the test taker (e.g. start, stop, pause). Icons representing students associated with an on-line testing session being proctored may be configured, updated, or adjusted by remote polling over a network, such as an intranet, internet, or the like. Icons or other student representations as herein described may include visual and/or audible attributes that may facilitate determining student status at a glance and from a distance. The student representations may include high contrast colors to differentiate status, or other attributes such as blinking, color changing, and the like. The representations of the test takers, whether graphic-, or text-based, may be movable within the proctoring screen so that a proctor, or plurality of proctors, may visually organize information relating to the test takers within the proctoring interface. Such organization of test takers' information may be accomplished based at least in part on a drag-and-drop functionality in which a proctor may click on a graphic or text that is associated with testing information and drag it to the location in the interface where the proctor desires it to reside. In embodiments, a proctor may organize information within the proctoring interface such as the physical location of test takers in a test environment, group test takers within the interface based at least in part on testing status (e.g., "active," "complete"), group test takers within the interface based at least in part on each test taker's test or subject matter (e.g., "History Chapter 2 Test," "English Composition Test," etc.), group test takers within the interface based at least in part on test takers' needs and/or special needs, group test takers within the interface based at least in part on a level of proctoring assistance needed, or some other organizational framework. The platform may facilitate automatic organization of the student representations, such as auto-sorting based on the number of completed questions. Automatic sorting and automatic organization of icons, within the various proctor interface screens and elements may provide a proctor the opportunity to walk throughout the testing site and glance at the proctoring interface as needed to determine tester status, respond to issues, and the like. The proctoring interface may be manipulated by the proctor throughout a test session, but may also be manipulated initially to ensure proper test initiation and thereafter be automatically updated by the platform, such as by polling each student station 102 to determine student status and other factors.

The proctor interface may include handheld and/or wireless computing devices in addition to standard computing devices so that a proctor may monitor test taker status while walking around the test facility. A proctor interface may also include video projection capabilities that may allow certain aspects of the proctor interface to be projected within the testing environment.

A proctor may use the Add Time general control 1608 to allow all students who have not finished to be granted additional time to take the test. Similarly to selecting Void Session, a confirmation of the Add Time selection may be required.

A proctor may use the Pause general control 1608 to suspend testing activity. A student taking the test may be presented with a window or alert indicating the test session is being paused. The proctor may be presented with a screen or pop-up window showing the elapsed time the test session is being paused and may further provide an alert such as an audible sound or a change in window color or animation as time continues to elapse. In an example, a proctor may select to pause a test session and a paused test session window may be displayed to the proctor. The paused test session window may change from green to red if the session is paused for more than 2 minutes or an audible alert may be issued to the proctor after each minute the test is paused. After a proctor pauses a test, the proctor may choose to add time because a student's concentration may be disrupted by the pause.

Figure 19:
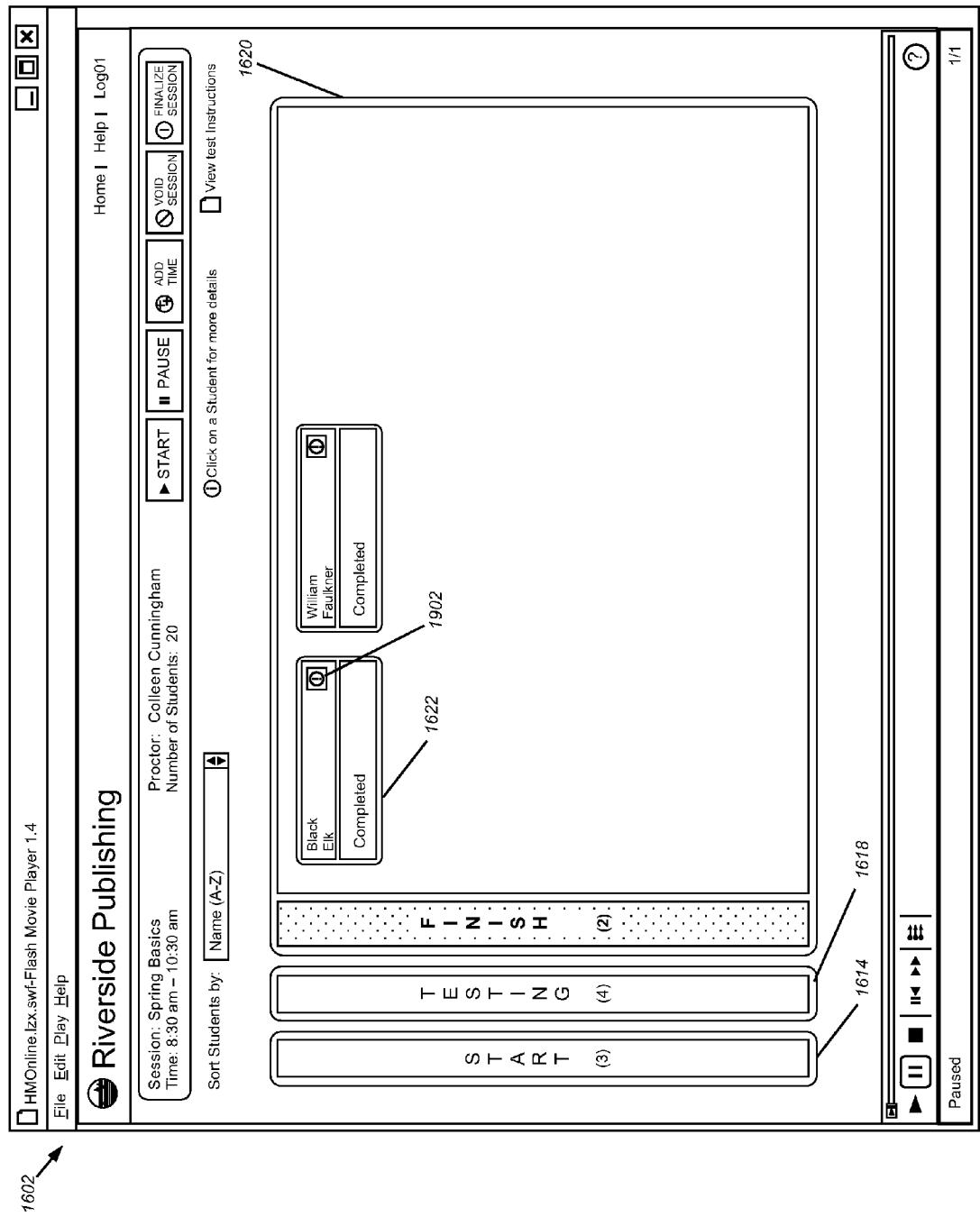
FIG. 19—depicts a finish panel of the proctoring screen of FIG. 16.

The Finalize Session general control 1608 may be used by the proctor to display a finalizing session screen and/or perform functions associated with finalizing the session, such as sending a message to each student indicating the session has been finalized. Finalizing may also indicate to other elements of the online test platform 100 that the answers submitted by the students during the test session are final and therefore are available for scoring. The Finalize Session general control 1608 may be conditionally enabled so certain conditions may be required to allow a proctor to finalize a test session. In an example, a test session may not be finalized if one or more students have not finished testing, or if the test end date 1422 as shown in FIGS. 14 and 15, is still in the future, or some combination of these or other conditions may be required to enable the Finalize Session general control 1608. Alternatively, the Finalize Session may be enabled whenever at least one student has finished a test session (as shown in FIG. 19). Selecting a Finalize Session may result in answers of students who have finished the test being made available for scoring.

The proctoring screen 1602 may also include a student sort control 1604 that may allow the proctor to select an alternate order display of student controls 1622. Student order may include alphabetical, reverse alphabetical, grouped by subtest, or ordered by status. Ordering students by status may allow a proctor to readily see all the students who are Absent (for example). Ordering the students into groups based on the subtest that the student is currently testing may be beneficial to a proctor for assessing the progress each student is making toward completing the test. Other student orderings may be provided such as based on a geographic location, a competency assessed level, a test duration, and the like. Student representations, such as icons, may represent the status of a student such as waiting for an exam to start, taking the exam, finished the exam, needing assistance, accommodated, a special need, summary of test status (questions answered, questions not answered), time left or time taken in a test session, and the like. The platform may store student or test related information in association with the student representations (icons). Wherein the icons are interactive, the proctor may access and act on the information stored in association with the icons by selecting the icons, such as by using a computer mouse to 'double-click' or 'right-click' the icon, or by holding the mouse cursor over the representation. A proctor may access a student representation and may store information entered by the proctor that is related to the student in association with the icon.

A proctor may take an action associated with a test taker by accessing the icon representing the student. Because the proctor interface may be implemented with FLASH technology using standard web browsers, the proctor may take an action from any computer networked with the student station 102, even if the proctor and student are on different networks or are served by different network providers. The proctor interface does not require dedicated functionality proctoring software loaded onto or operating on the proctor station. A proctor may access an interactive student representation icon and take an action such as start a test, stop a test, pause a test, restart a test, void a test or test section, add time, subtract time, send a text or instant message to the test taker, receive text or instant messages from the test taker, provide the test taker assistance, and the like.

The student representation (icon) may include more than one selectable action area. Certain types of actions may be associated with different action areas. Some action areas may be for inquiries, others for proctor action, yet others for icon movement, and the like. The proctor action may be initiated by selecting an action button included in the icon.

Student representations may include text, icons, images, and the like. The text may be a variety of sizes, fonts, colors, animations, artistic effects, and the like. An icon may be a single color, a plurality of colors, a graphic, a combination of text and graphics and the like. Images may include a photograph of the student, a movie of the student, and the like. The display of student representations and other aspects of the proctor interface may be automatically adapted to facilitate easy viewing of critical attributes and status of students taking the test. In an example, the size and relative position of the icons may be automatically adjusted to display the icon for every student on the screen at the same time. In another example, only students meeting criteria such as needing help, taking excessively long to complete questions, nearing completion and the like may be automatically displayed on the proctoring interface. There is a wide variety of beneficial arrangements of student representations that may be effectively used by a proctor and all of these configurations are contemplated by the examples and description in this disclosure.

The proctoring interface may include presentation of results of analysis of information associated with a proctored testing session. The platform may include functionality that may allow receiving data associated with an on-line test session, performing statistical and other analysis on the data, and presenting the result within the proctoring interface. The type and extent of analysis may be based at least in part on the data received. The analysis may be related to which subtests have been completed, are being taken, and the like. The analysis may relate to one or more test questions, to the test as a whole, a portion of the test, a test taker, a test site, a proctor, time durations for questions, tests, sub tests, test result pass/fail rates, percentages, and the like. The analysis may be presented as text, such as a table, as a graphic such as a pie chart, graph, and the like.

The open student start panel 1614 may include one or more individual student controls 1622. Student controls 1622 may be presented for each student associated with the test. Controls 1622 may further be associated with a status panel such as the Start status test panel 1614. Each student control 1622 may display a status of the student wherein the available status is associated with the particular test status panel in which the user control 1622 is displayed. The start status panel 1614 may allow a student status to include Online and Absent. An Online student may be ready to start the test session. An Absent student may be unavailable to start the test session. The status of each student may be provided by the online test platform 100 and may be based on a state of the student's login status or other selections made by the student. In an example of FIG. 16, a student who has logged into the online test platform 100 and has selected to begin the Spring Basics test shown in the proctoring header 1604 may appear to the proctor as "Online" in the Start status panel 1614. A student, who has not logged into the online test platform 100 or has not selected to begin the Spring Basis test, may appear to the proctor as "Absent".

Selecting a student control 1622 may provide the proctor with more information about the student. This may be presented in a pop-up window, or other window of the proctoring user interface. Alternatively, moving the computer pointer (e.g. the mouse) over a student control 1622 may display more information about the student. A proctor may cause a student status to change from "start" to "testing" by selecting the activation arrow 1624 associated with a student ready to begin testing, such as a student with an Online status displayed in the student control 1622. Changing the status of a student to "testing" may allow a student to begin taking the test.

Figure 17:
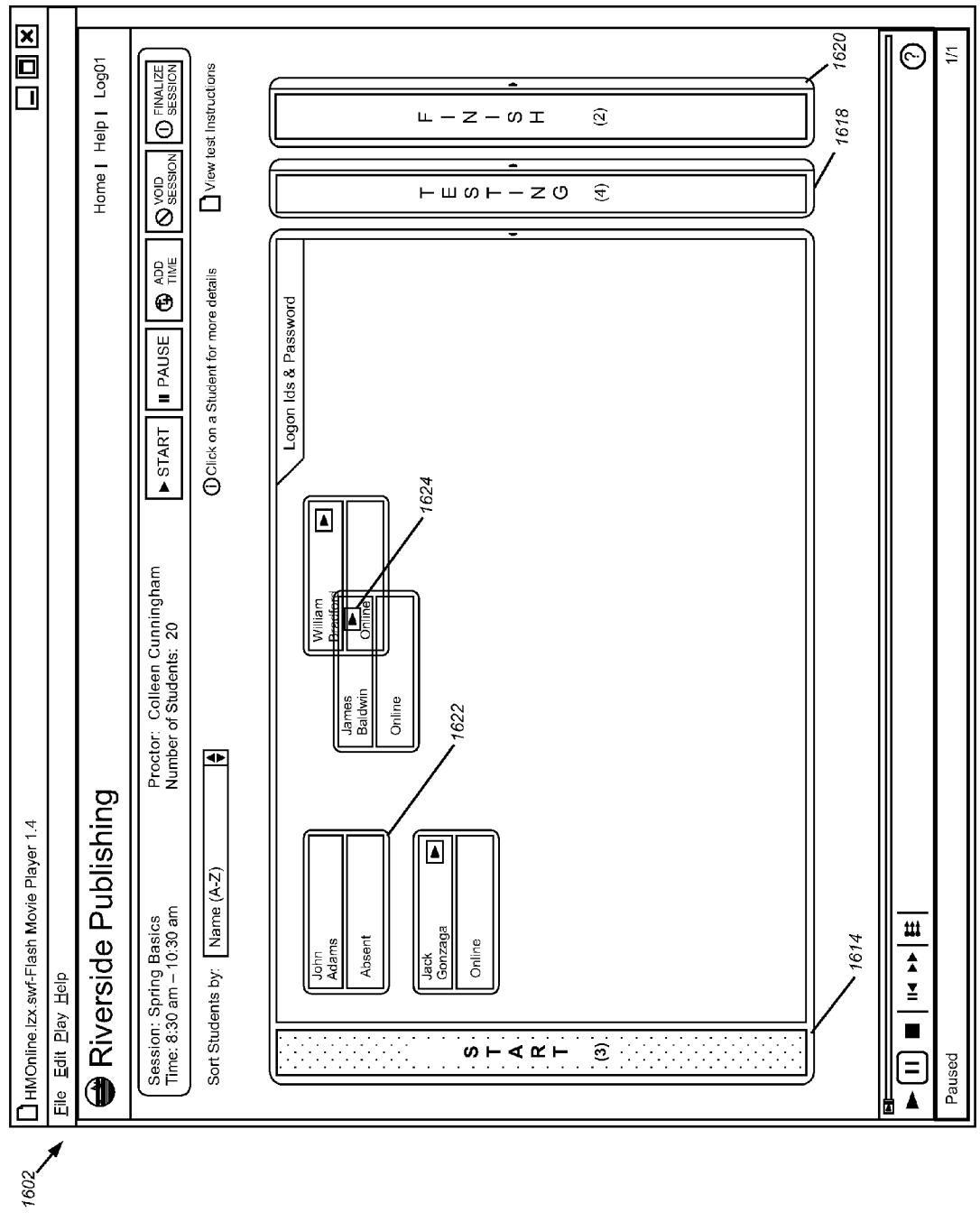
FIG. 17—depicts an individual student control moving within the proctoring screen of FIG. 16.

FIG. 17 shows an example of the action of changing a student from "start" to "testing". A proctor has selected the activation arrow 1624 of student named "James Baldwin" and the control 1622 for the student visually reflects the selected action of moving the student from Start to Testing by changing intensity slightly and moving on the screen from the position on the Start panel 1614 where it was activated to the Testing panel 1618. The action is completed visually by the closed Testing panel 1618 opening slightly to accept the activated student control 1622. Each student control 1622 with an activation control 1624 can be so transferred by the proctor. Selecting the Start general control 1608 may cause all of the controls 1622 of the Online students to be so transferred.

Each status panel (1614, 1618, 1620) may include a count of students associated with the particular status panel. As seen in FIG. 17, the Start test status panel has 5 students associated with it and the number (5) appears below the panel name "START" on the left side of the panel. The sum of the students associated with each panel may be equal to the number of students presented in the proctoring header 1604, so that the proctor can account for each student identified in the test 1414 in FIG. 14 and the expanded test 1514 in FIG. 15.

Referring back to FIG. 15, in addition to the status of each student being displayed in the student controls 1622 of each test status panel, the expanded test 1514 may display a list of student status and may include information such as assessment, current subtest, student activity duration, and student name. Selecting a student name from the status list in expanded test 1514 may display more information about the student or may change to the proctoring window with the appropriate test status panel displayed including the student control 1622 of the selected student. In an example, selecting a student name on the status list displayed in the expanded test 1514 of FIG. 15, may display a proctoring window 1602 with the testing panel 1618 opened as shown in FIG. 18.

Figure 18:
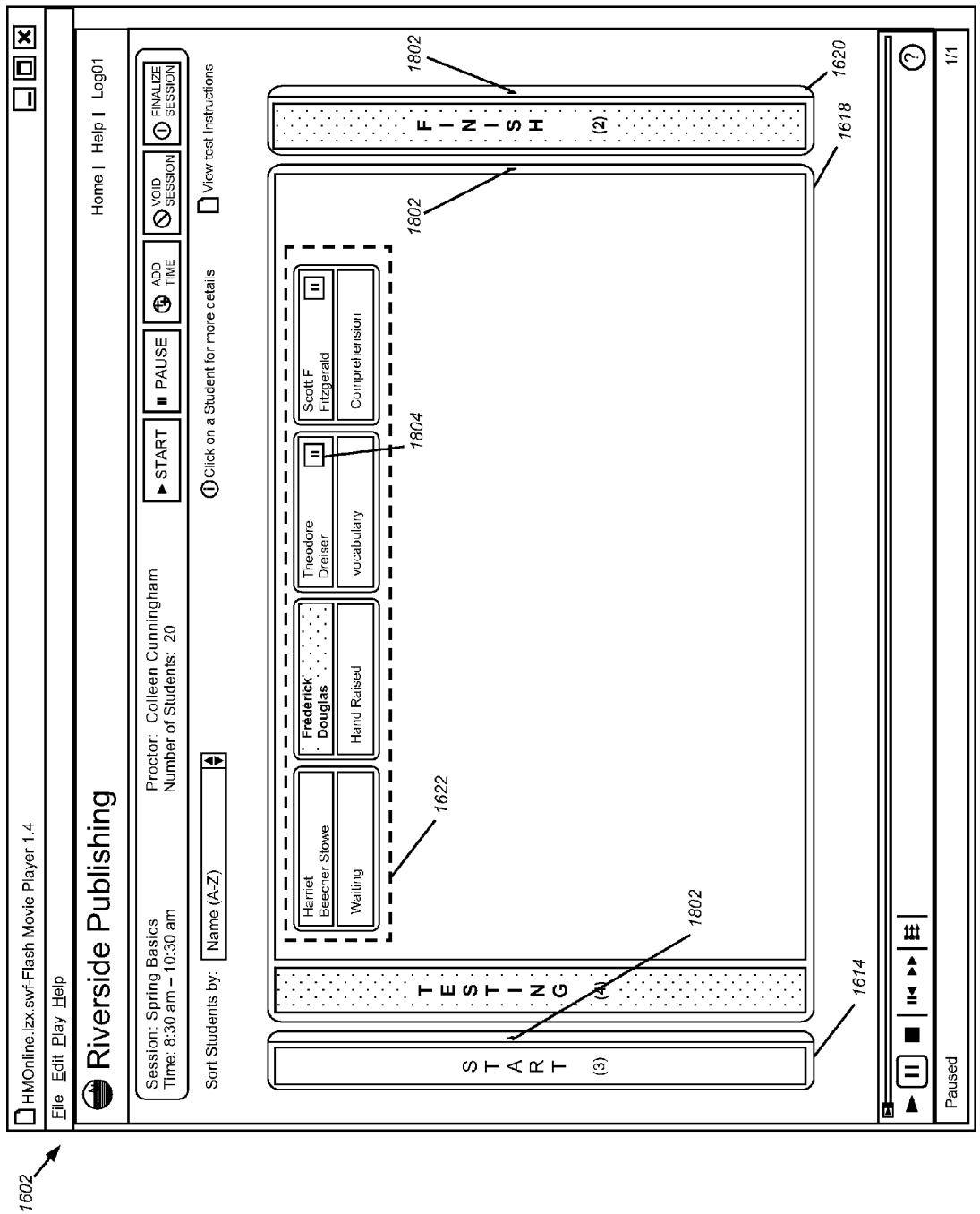
FIG. 18—depicts a testing panel of the proctoring screen of FIG. 16.

Referring to FIG. 18, the proctoring screen 1602 is shown with the Start test status panel 1614 closed and the testing status panel 1618 open. The Testing panel 1618 may be opened by the proctor selecting the Test panel open/close control 1802. The testing panel 1618 may automatically open when the proctor selects to close the Start status panel 1614. The panel open/close control 1802, when selected, may allow a closed panel to open or an open panel to close. The proctor user interface includes automatic logic to ensure at least one test status panel is open at all times when the proctoring screen 1602 is displayed. The automatic logic may follow rules that determine which panel will open when a panel is closed. In an example of automatic panel open/close logic, closing the Start panel 1614 may open the Testing panel 1618, closing the Testing panel 1618 may open the Finish panel 1620, and closing the Finish panel 1620 may open the Testing panel 1618. As herein described, other combinations of open and closed test status panels may be included. Logic for these other combinations may support closing all of the panels or opening more than one of the panels.

The testing panel 1618 may include student controls 1622 that include representations of the student status. The status representations may include text, color, animation, or any combination of text, color, and animation. The status representations available to be displayed may be associated with the Testing panel 1618. The status representations may or may not be available when the Start status panel 1614 or the Finish panel 1620 is opened. Status displayed in a particular student control 1622 may be associated with the actual status of the particular student. The status may include a subtest name if the student does not require proctoring activity. The status may include text such as "Waiting" or "Hand Raised" to indicate the student may need proctoring activity.

A student control 1622 may display a subtest that the student is currently taking. When the student moves to another subtest, the subtest name displayed in the student control 1622 may change to reflect the move. In FIG. 18, student "Theodore Dreiser" is currently taking the Vocabulary subtest, while student "F. Scott Fitzgerald" is taking the Comprehension test. These two student controls 1622 are displayed with a green background to indicate no proctoring activity is required. These two student controls 1622 also may include a pause control 1804. Proctoring may sometimes require pausing one or more students to provide important updates. Selecting the pause control 1804 on a particular student may pause the particular student's test session.

In embodiments, a proctor may select a test taker by clicking on the student control 1622 in order to open a student-specific window. This window may include some of the same information presented in the student control 1622, such as student name, status (e.g., "waiting"), and the like, as well as additional information regarding accommodations, subtests, or some other student-related information. The fields pertaining to accommodations and subtests may be text entry fields in which a proctor may list comments, notes for other proctors or administrators, or some other test-related information. In another embodiment, the accommodations and subtests fields may include pre-filled information for the proctor's review. For example, in the subtests field there may be a listing of all subtests that a test taker is scheduled to take. Each subtest may be associated with a button that a proctor may use to void or cancel a subtest, or alter the scheduled subtest in some other manner. There may also be a "comments" text field for a proctor to enter general comments pertaining to whatever the proctor wishes. The student-specific window may include additional buttons that the proctor may select for activities such as starting a test, adding time to the total amount of time that a test taker is permitted to complete a test, voiding a test session, logging off, or some other activity.

In embodiments, once the proctor clicks on the play, or start button, the test may be presented to the test taker for him to begin a test session. As a test taker progresses through the test, the proctor may monitor the test taker's progress using the student control 1622. For example, the student-specific window may display the number of questions that a student has answered out of the total number of test questions. As the proctor monitors each test taker's progress, he may pause an exam, add time to an exam, or assist a test taker in some other manner. While a test is paused by the proctor, the student will be unable to interact with the test. For each action taken by the proctor (e.g. adding 5 minutes to a test taker's permitted time), an audit trail is created in which the proctor's action(s) are recorded for later review. This audit trail may provide a text box for a proctor to provide additional information about why a particular action was taken (e.g., "student given extra time due to having to take medication during exam"). In another example, a proctor may add a comment to a student action, such as "raising hang," so that it may be better understood during a future review of the testing period.

In embodiments, students may be sorted by the proctor based at least in part on the type of exam that each student is taking. For example, the testing period may be devoted to a reading comprehension test. However, within the class of test takers, there may be 4 levels of reading aptitude, each associated with a different type of reading comprehension exam. The proctor may arrange the student control 1622 for each group of test takers so that all students taking the same type of exam are physically located together within the proctoring interface.

Further in FIG. 18, student "Frederick Douglas" has raised his hand, indicating Frederick is requesting assistance from the proctor. Frederick's student control 1622 is displayed in red to indicate to the proctor that the student may have stopped testing or cannot proceed properly without assistance. Alternatively, Frederick may be proceeding with the test but cannot complete the test without proctor assistance. However, Frederick may be able to proceed and complete the test without proctor assistance, but may have an important question for the proctor. The proctor may provide assistance to the student in a variety of ways. The proctor may support Frederick by selecting Frederick's control 1622. Selecting Frederick's control 1622 may provide an indication to Frederick that the proctor is available to provide assistance. Assistance may include opening a communication window, such as a chat window, or allowing Frederick to speak with the proctor through a VoIP type connection. The communication window and/or the VoIP connection may be integral to the online test platform 100 or may be provided by a third party such as Yahoo! Messenger. In an embodiment, the communication window may be blocked if the student may be using a secure browser. The online test platform 100 may facilitate a proctor viewing a student's computer screen to facilitate providing support to the student. The online test platform 100 may further facilitate a proctor taking control of a student's computer to resolve a problem remotely.

Referring again to FIG. 18, student "Harriett Beecher Stowe" may be waiting for some information, event, or authorization from the proctor or the online test platform 100. Harriett's student control 1622 is displayed with a yellow background, perhaps to indicate Harriett needs assistance but is not being prevented from proceeding with the test. The color of the background of the student control 1622 may be associated with the severity of the status so that the proctor can quickly see which student or students require assistance most severely.

As a student completes all aspects of the test session, or otherwise asserts that the student is finished with the test session, the student control 1622 will automatically move from the Testing status panel 1618 to the Finish status panel 1620. Visually, this may be similar to activating a student described in FIG. 17.

Referring to FIG. 19, a depiction of the proctor screen 1602, the Finish panel 1620 is displayed open. Closing the Testing panel 1618 may automatically open the Finish panel 1620. Alternatively, the proctor may open the Finish panel 1620 which may automatically close the Testing panel 1618. The Finish test status panel 1620 may include student controls 1622. The student controls 1622 associated with, and displayed in the Finish status panel 1620 may represent students who have completed all testing associated with the current test session. The student controls 1622 shown in FIG. 19 may indicate that the students "Black Elk" and "William Faulkner" have completed the Spring Basics test session. The color or other attribute of the student controls 1622 in the Finish status panel 1620 may be based on an aspect of the test session. While the controls for Elk and Faulkner are shown in green and may indicate a normal or expected completion of the test session, the controls 1622 may indicate an abnormal completion of the test session. In an example, a student who has completed the test session, but who answered a relatively small number of questions, and thereby leaving many answers blank, may be indicated by a different color, such as red or yellow. Alternatively, a student who asked for support from the proctor more than a maximum threshold of support requests may be displayed in a different color, such as blue.

Each student control 1622 in the Finish test status panel 1620 may include a proctor acceptance selection 1902. Although a student may have completed a test session, the proctor may be required to accept the student completion to validate the student responses. In this way, the proctor may review information about the student, the current test session, any automated assessment by the online test platform 100 about the student's activity during the test session, and the like, before accepting the student answers and finalizing them for scoring.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method comprising:
    logging a test taker into an online testing platform prior to beginning an online test;
    using a web browser in association with a computing facility;
    placing the test taker in a virtual waiting room following the login;
    presenting the test taker a practice test question while in the virtual waiting room;
    polling the web browser to obtain data relating to a performance criterion of the test taker in association with the practice test question;
    analyzing the data in association with a performance rule; and
    determining a preparedness level of the test taker to take a test based at least in part on a result of the analysis.

2. The method of claim 1, wherein the practice test question is based on at least one aspect of a test taker profile.

3. The method of claim 1, wherein the practice test question is based on at least one test taker accommodation.

4. The method of claim 1, further comprising adjusting the number of practice test questions presented to the user.

5. The method of claim 1, further comprising adjusting a number of opportunities to select a correct answer.

6. The method of claim 1, further comprising adjusting a time associated with the test taker.

7. The method of claim 1, wherein the practice test question is dynamically generated for the test taker based at least on one aspect of a user profile.

8. The method of claim 7, wherein the step of dynamically generating comprises using a dynamic animation compilation facility.

9. The method of claim 1, wherein the practice test question in an online test session presented to the user is based at least in part on a preparedness level of the test taker.

10. The method of claim 1, further comprising compiling an online test comprising only questions, accommodations and other adjustments determined for the test taker.

11. The method of claim 1, wherein an accommodation of the test taker's environment is offered to a user based on a preparedness level.

12. A method comprising:
    logging a test taker into an online testing platform prior to beginning an online test;
    using a web browser in association with a computing facility;
    placing the test taker in a virtual waiting room following the login;
    sending a signal to a proctor interface that the test taker has logged in and is waiting;
    presenting the test taker a practice test question while in the virtual waiting room;
    polling the web browser to obtain data relating to a performance criterion of the test taker in association with the practice test question;
    analyzing the data in association with a performance rule; and
    determining a preparedness level of the test taker to take a test based at least in part on a result of the analysis.

13. The method of claim 12, further comprising checking an answer to the practice test question while remaining in the virtual waiting room.

14. The method of claim 12, further comprising selecting an accommodation for the test taker in the virtual waiting room based on a stored profile of the test taker.

15. The method of claim 12, wherein the test taker's testing environment comprises audio.

16. The method of claim 12, wherein the test taker's testing environment comprises text or images.

17. The method of claim 12, wherein the test taker's testing environment comprises a font size or a volume.

18. The method of claim 12, wherein the test taker's testing environment comprises a contrast or a brightness.

19. The method of claim 12, wherein the test taker's testing environment comprises a time duration.

20. The method of claim 12, wherein the test taker's testing environment comprises a language.

\* \* \* \* \*